(12) United States Patent
Ehara

(10) Patent No.: US 9,516,448 B2
(45) Date of Patent: Dec. 6, 2016

(54) INFORMATION PROCESSING DEVICE, COMMUNICATION SYSTEM, AND INFORMATION PROCESSING METHOD

(75) Inventor: Tadashi Ehara, Kanagawa (JP)

(73) Assignee: Sony Corporation, Tokyo (JP)

( * ) Notice: Subject to any disclaimer, the term of this patent is extended or adjusted under 35 U.S.C. 154(b) by 503 days.

(21) Appl. No.: 13/608,198

(22) Filed: Sep. 10, 2012

(65) Prior Publication Data

US 2013/0084905 A1    Apr. 4, 2013

(30) Foreign Application Priority Data

Oct. 4, 2011 (JP) .................................. 2011-219703

(51) Int. Cl.
| | |
|---|---|
| *H04B 7/00* | (2006.01) |
| *H04W 4/00* | (2009.01) |
| *H04L 29/06* | (2006.01) |
| *H04W 12/08* | (2009.01) |

(52) U.S. Cl.
CPC ............ *H04W 4/003* (2013.01); *H04W 4/005* (2013.01); *H04L 63/104* (2013.01); *H04W 12/08* (2013.01)

(58) Field of Classification Search
USPC ... 455/41.1, 41.2, 435.3; 709/218, 219, 227, 709/231, 240
See application file for complete search history.

(56) References Cited

U.S. PATENT DOCUMENTS

| | | | | |
|---|---|---|---|---|
| 7,471,644 B2* | 12/2008 | Sakai | ............................ | 370/254 |
| 8,676,273 B1* | 3/2014 | Fujisaki | ........................ | 455/567 |
| 2001/0004254 A1* | 6/2001 | Okahara et al. | .............. | 345/157 |
| 2002/0010772 A1* | 1/2002 | Kusano | ......................... | 709/223 |
| 2003/0026226 A1* | 2/2003 | Miura | ................... | H04W 72/10 370/335 |
| 2006/0023733 A1* | 2/2006 | Shimizu et al. | .............. | 370/432 |
| 2008/0320153 A1* | 12/2008 | Douville et al. | ............. | 709/229 |
| 2009/0175268 A1* | 7/2009 | Li et al. | ........... | H04L 29/06027 370/352 |
| 2010/0082567 A1* | 4/2010 | Rosenblatt et al. | .......... | 707/705 |
| 2010/0103851 A1* | 4/2010 | Chintada et al. | ............. | 370/312 |
| 2010/0265179 A1* | 10/2010 | Ram | ............................ | 345/163 |

OTHER PUBLICATIONS

3$^{rd}$ Generation Partnership Project: Technical Specification Group Services and System Aspects; Feasibility study on the security aspects of remote provisioning and change of subscription for Machine to Machine (M2M) equipment (Release 9), 3GPP TR 33.812, Jun. 2010, 87 pages, vol. 9 (2.0), 3GPP.

* cited by examiner

*Primary Examiner* — Dominic Rego

(74) *Attorney, Agent, or Firm* — Chip Law Group

(57) ABSTRACT

An information processing device, includes a setting unit configured to set, based on user operations or predetermined rules, a priority order regarding multiple wireless communication devices sharing connection rights to connect to a predetermined network using wireless communication, wherein, in the event that transfer of the connection rights is to be performed between the multiple wireless communication devices using wireless communication, the transfer is performed based on the priority order set to the wireless communication devices which are the object of the transfer.

14 Claims, 24 Drawing Sheets

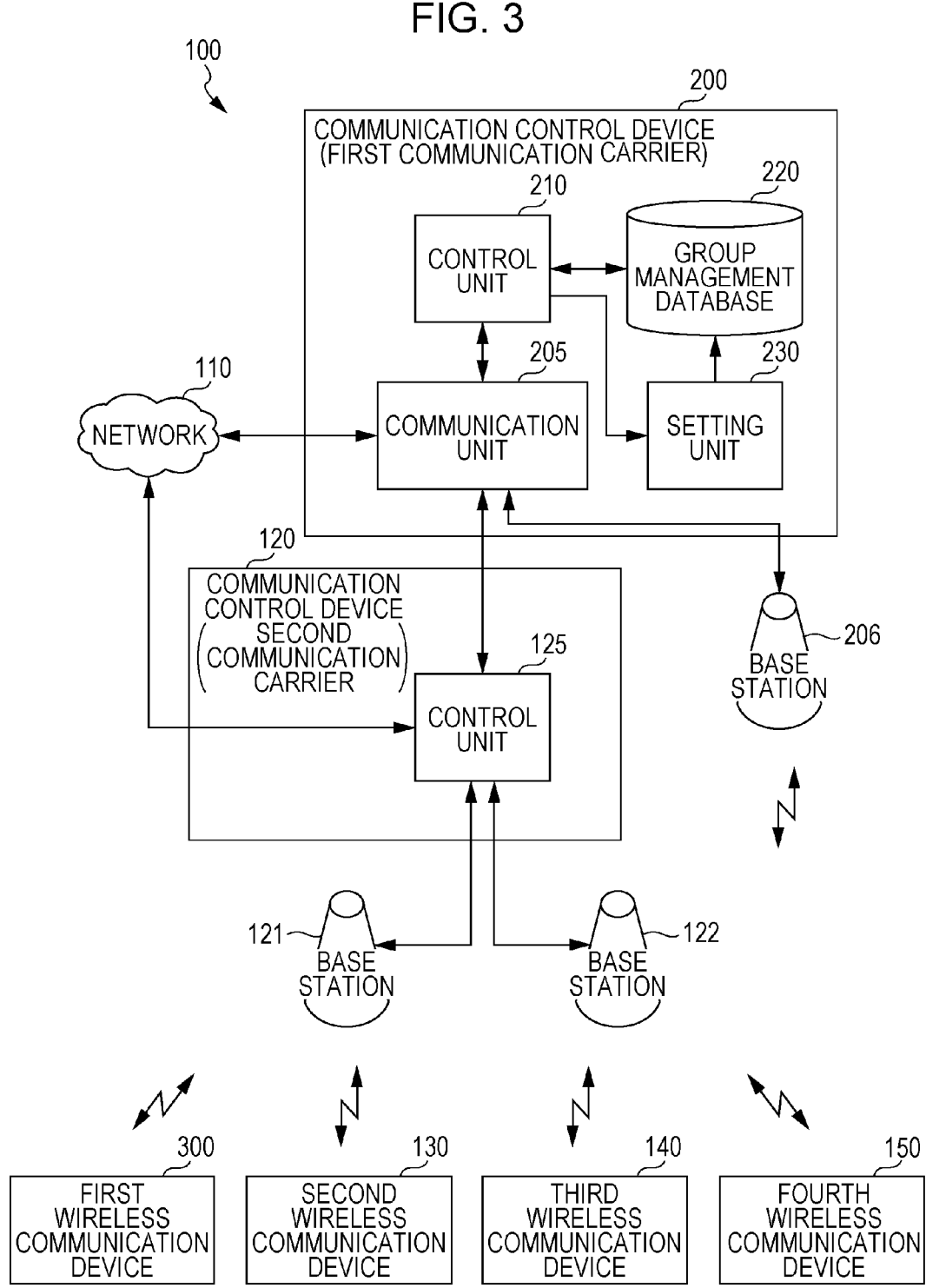

FIG. 8

| OPERATED DEVICE | TRANSFER MCIM USAGE RIGHTS FROM HIGHER ORDER DEVICE TO LOWER ORDER DEVICE | TRANSFER MCIM USAGE RIGHTS FROM LOWER ORDER DEVICE TO HIGHER ORDER DEVICE |
|---|---|---|
| DEVICE OF HIGHER ORDER THAN OBJECT OF TRANSFER | PERMISSIBLE | PERMISSIBLE |
| DEVICE OF LOWER ORDER THAN OBJECT OF TRANSFER | IMPERMISSIBLE | PERMISSIBLE |
| OTHER DEVICE (INCLUDING OUTSIDE OF GROUP) | IMPERMISSIBLE | PERMISSIBLE |

THE OPERATION THAT HAS BEEN MADE FOR MCIM USAGE RIGHTS TRANSFER IS NOT EXECUTABLE SINCE IT INVOLVES MCIM USAGE RIGHTS TRANSFER FROM A DEVICE WITH HIGHER ORDER PRIORITY ORDER TO A DEVICE WITH LOWER ORDER.

TO TRANSFER MCIM USAGE RIGHTS TRANSFER FROM A DEVICE WITH HIGHER ORDER PRIORITY ORDER TO A DEVICE WITH LOWER ORDER, PERFORM OPERATIONS FROM THE HIGHER ORDER DEVICE FROM WHICH TRANSFER IS TO BE MADE.

| 421 | 422 | 423 |
|---|---|---|
| OPERATED DEVICE | TRANSFER MCIM USAGE RIGHTS FROM HIGHER ORDER DEVICE TO LOWER ORDER DEVICE | TRANSFER MCIM USAGE RIGHTS FROM LOWER ORDER DEVICE TO HIGHER ORDER DEVICE |
| DEVICE OF HIGHER ORDER THAN OBJECT OF TRANSFER | PERMISSIBLE | PERMISSIBLE |
| DEVICE OF LOWER ORDER THAN OBJECT OF TRANSFER | ONLY PERMISSIBLE WITH AUTHORIZATION OF HIGHER ORDER DEVICE | PERMISSIBLE |
| OTHER DEVICE (INCLUDING OUTSIDE OF GROUP) | ONLY PERMISSIBLE WITH AUTHORIZATION OF HIGHER ORDER DEVICE | PERMISSIBLE |

FIG. 22

| | 422 | 423 |
|---|---|---|
| 421 OPERATED DEVICE | TRANSFER MCIM USAGE RIGHTS FROM HIGHER ORDER DEVICE TO LOWER ORDER DEVICE | TRANSFER MCIM USAGE RIGHTS FROM LOWER ORDER DEVICE TO HIGHER ORDER DEVICE |
| DEVICE OF HIGHER ORDER THAN OBJECT OF TRANSFER | PERMISSIBLE | PERMISSIBLE WITH RE-AUTHORIZATION OF HIGHER ORDER DEVICE ONLY IN CASE OF REJECTION AT LOWER ORDER DEVICE |
| DEVICE OF LOWER ORDER THAN OBJECT OF TRANSFER | ONLY PERMISSIBLE WITH AUTHORIZATION OF HIGHER ORDER DEVICE | PERMISSIBLE |
| OTHER DEVICE (INCLUDING OUTSIDE OF GROUP) | ONLY PERMISSIBLE WITH AUTHORIZATION OF HIGHER ORDER DEVICE | PERMISSIBLE WITH RE-AUTHORIZATION OF HIGHER ORDER DEVICE ONLY IN CASE OF REJECTION AT OPERATED DEVICE |

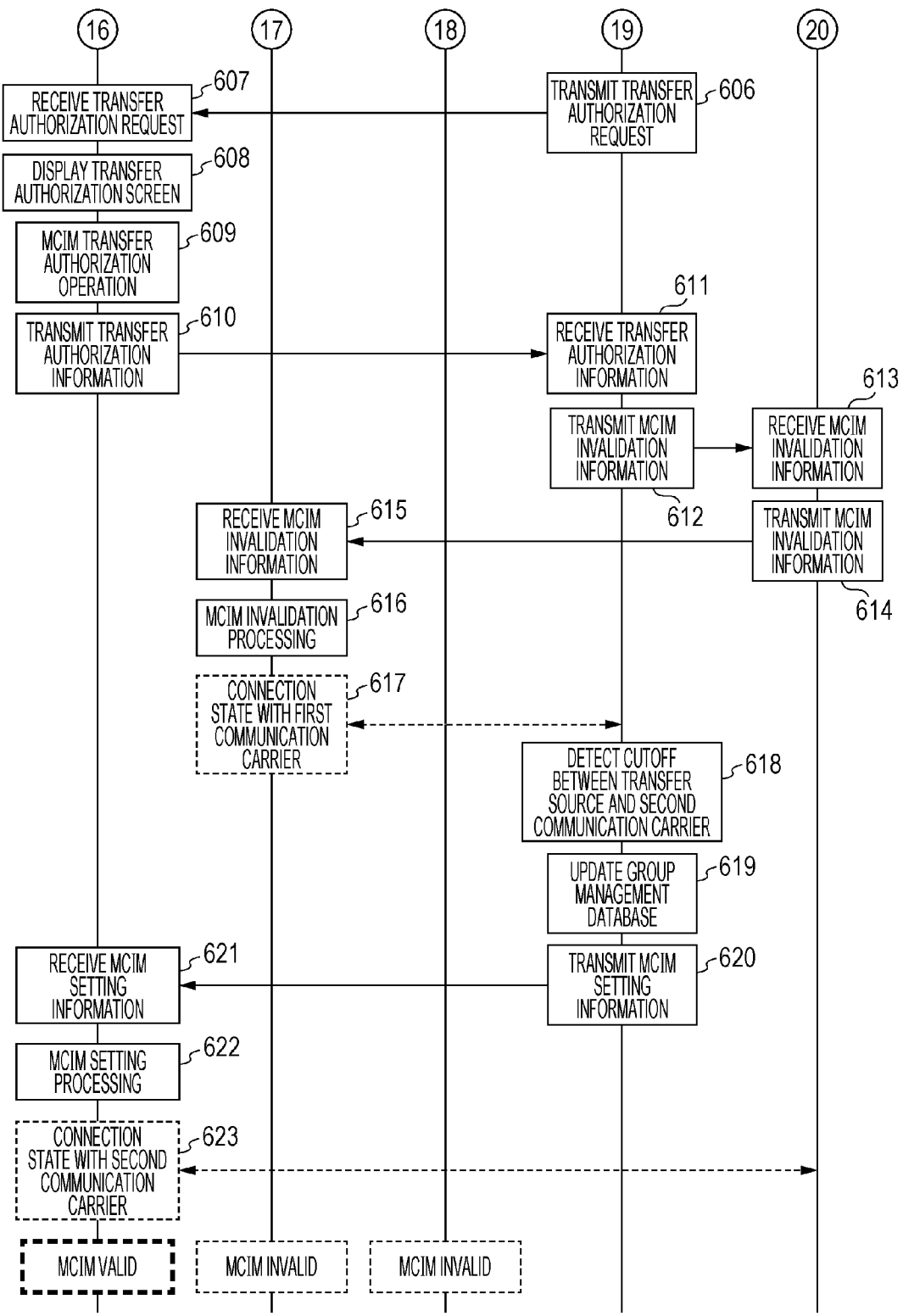

INFORMATION PROCESSING DEVICE, COMMUNICATION SYSTEM, AND INFORMATION PROCESSING METHOD

BACKGROUND

The present disclosure relates to an information processing device. More particularly, the present disclosure relates to an information processing device which connects to a network, a communication system including the same, and an information processing method. Currently, a functions extension is being studied in the 3GPP (3rd Generation Partnership Project) which lays out technical specifications for public wireless communication networks (e.g., see 3GPP TR 33.812 V9.2.0 (2010-06)).

This functions extension (called "Machine to Machine Equipment") allows flexible application of information indicating that a service is available. This information indicating that a service is available is called MCIM (Machine Communication Identity Module). For example, an MCIM can be downloaded from a network, temporarily stopped, and resumed.

Also, information corresponding to this MCIM has to be saved in a physical device called a SIM (Subscriber Identity Module) card. However, handling MCIM as software enables the saving method to be more flexible as well.

SUMMARY

Ways of using MCIM that are different from those heretofore can be conceived by using the above-described function extension. For example, sharing MCIMs among multiple wireless communication devices can be conceived. However, even in the event of sharing MCIMs in this way, a wireless communication device regarding which no MCIM has been set will not be able to use communication functions based on MCIM. Accordingly, it will be important to prevent an MCIM from being set to a wireless communication device unintended by the user, so that MCIMs are appropriately shared among multiple wireless communication device.

It has been found desirable to share connection rights for connecting to a predetermined network using wireless communication among multiple wireless communication devices in an appropriate manner.

According to an embodiment of the present technology, an information processing device, an information processing method, and a program for causing a computer to execute the method, include: a setting unit configured to set, based on user operations or predetermined rules, a priority order regarding multiple wireless communication devices sharing connection rights to connect to a predetermined network using wireless communication; wherein, in the event that transfer of the connection rights is to be performed between the multiple wireless communication devices using wireless communication, the transfer is performed based on the priority order set to the wireless communication devices which are the object of the transfer. This yields an advantage that in the event of performing transfer of connection rights using wireless communication between multiple wireless communication devices, the transfer is performed based on the priority order set for the wireless communication devices which are the object of the transfer.

The information processing device may further include a control unit configured to control, in the event of accepting a transfer request for transferring the connection rights between the plurality of wireless communication devices, transfer of the connection rights between the wireless communication devices based on the priority order set to the wireless communication devices relating to the transfer request; with the information processing device being an information processing device managing the plurality of wireless communication devices as a group. This yields an advantage that in the event of accepting a transfer request for transfer of connection rights between multiple wireless communication devices, the connection rights are transferred between the multiple wireless communication devices based on the priority order set for the wireless communication devices which are the object of the transfer.

With regard to a first wireless communication device and a second wireless communication device making up the plurality of wireless communication devices, the setting unit may set the second wireless communication device to a priority order lower than a priority order set to the first wireless communication device; with the control unit, in the event of having accepted the transfer request to transfer the connection rights from the first wireless communication device to the second wireless communication device, from a wireless communication device other than the first wireless communication device, effecting control to transfer the connection rights from the first wireless communication device to the second wireless communication device only in the event that predetermined conditions are satisfied. This yields an advantage that, in the event of accepting a transfer request for transferring the connection rights from the first wireless communication device to the second wireless communication device, from a wireless communication device other than the first wireless communication device, the connection rights are transferred from the first wireless communication device to the second wireless communication device only in the event that predetermined conditions are satisfied.

The control unit may determine that the predetermined conditions have been satisfied in the event that transfer authorization processing has been performed at the first wireless communication device, relating to the transfer request to transfer the connection rights from the first wireless communication device to the second wireless communication device. This yields an advantage that the predetermined conditions are determined to have been satisfied in the event that transfer authorization processing has been performed at the first wireless communication device relating to the transfer request to transfer the connection rights from the first wireless communication device to the second wireless communication device.

With regard to a first wireless communication device and a second wireless communication device making up the plurality of wireless communication devices, the setting unit may set the second wireless communication device to a priority order lower than a priority order set to the first wireless communication device; with the control unit, in the event of having accepted the transfer request to transfer the connection rights from the second wireless communication device to the first wireless communication device, effecting control to transfer the connection rights from the second wireless communication device to the first wireless communication device. This yields an advantage that, in the event of having accepted a transfer request to transfer the connection rights from the second wireless communication device to the first wireless communication device, the connection rights are transferred from the second wireless communication device to the first wireless communication device.

The control unit may, in the event of having accepted the transfer request to transfer the connection rights from the second wireless communication device to the first wireless communication device, from a wireless communication device other than the second wireless communication device, effect control to transfer the connection rights from the second wireless communication device to the first wireless communication device only in the event that predetermined conditions are satisfied. This yields an advantage that, in the event of having accepted a transfer request to transfer the connection rights from the second wireless communication device to the first wireless communication device from a wireless communication device other than the second wireless communication device, the connection rights are transferred from the second wireless communication device to the first wireless communication device only in the event that predetermined conditions are satisfied.

The control unit may determine that the predetermined conditions have been satisfied in a case of transfer authorization processing having been performed at the second wireless communication device, relating to the transfer request to transfer the connection rights from the second wireless communication device to the first wireless communication device, or in a case of transfer authorization processing having not been performed at the second wireless communication device relating to the transfer request, and also authorization processing having been performed at the first wireless communication device relating to the transfer request. This yields an advantage that determination is made that the predetermined conditions have been satisfied in a case of authorization processing having been performed at the second wireless communication device, relating to the transfer request to transfer the connection rights from the second wireless communication device to the first wireless communication device, or in a case of transfer authorization processing having not been performed at the second wireless communication device relating to the transfer request, and also transfer authorization processing having been performed at the first wireless communication device relating to the transfer request.

With regard to a first wireless communication device and a second wireless communication device making up the plurality of wireless communication devices, the setting unit may set the second wireless communication device to a priority order lower than a priority order set to the first wireless communication device; with the control unit, in the event of having accepted the transfer request from the first wireless communication device to transfer the connection rights from the first wireless communication device to the second wireless communication device, effecting control to transfer the connection rights from the first wireless communication device to the second wireless communication device. This yields an advantage that in the event of having accepted a transfer request from the first wireless communication device to transfer the connection rights from the first wireless communication device to the second wireless communication device, the connection rights are transferred from the first wireless communication device to the second wireless communication device.

The setting unit may set priority order for each of the plurality of wireless communication devices as the priority order. This yields an advantage that priority order is set for each of the plurality of wireless communication devices as the priority order.

The information processing device may further include: a storage unit configured to store the plurality of wireless communication devices and the set priority order, in a correlated manner for each of the wireless communication devices; the information processing device being an information processing device managing the plurality of wireless communication devices as a group, and the storage being performed in increments of the groups. This yields an advantage that a storage unit is used to store the plurality of wireless communication devices and the set priority order in a correlated manner for each of the wireless communication devices, in increments of groups.

The information processing device may further include a control unit configured to perform the transfer request for transfer of the connection rights between the plurality of wireless communication devices to an RO (Registration Operator), with the information processing device being the wireless communication device. This yields an advantage that the transfer request for transfer of the connection rights between the plurality of wireless communication devices is made to an RO.

The connection rights may be rights to connect to a base station operated by a communication carrier, based on subscriber authentication information to connect to the base station. This yields an advantage that rights to connect to a base station operated by a communication carrier, based on subscriber authentication information to connect to the base station, are used as connection rights.

According to an embodiment, a communication system, a processing method, and a program for causing a computer to execute the method, include: an information processing device configured to set, based on user operations or predetermined rules, a priority order regarding multiple wireless communication devices sharing connection rights to connect to a predetermined network using wireless communication; wherein, in the event that transfer of the connection rights is to be performed between the multiple wireless communication devices using wireless communication, the transfer is performed based on the priority order set to the wireless communication devices which are the object of the transfer. This yields an advantage that, in the event that transfer of the connection rights is to be performed between multiple wireless communication devices using wireless communication, the transfer is performed based on the priority order set to the wireless communication devices which are the object of the transfer.

According to the present technology, excellent advantages can be had in that connection rights to connect to a predetermined network using wireless communication can be suitably shared between multiple wireless communication devices.

BRIEF DESCRIPTION OF THE DRAWINGS

FIG. 3 is a block diagram illustrating a system configuration example of a communication system according to the first embodiment;

FIG. 8 is a diagram illustrating an example of determination standards regarding transfer of MCIM usage rights among the wireless communication devices according to the first embodiment;

FIG. 10 is a diagram illustrating a display screen example (transfer impermissible notification screen) displayed on the display unit of the first wireless communication device according to the first embodiment;

FIG. 17 is a diagram illustrating an example of determination standards regarding transfer of MCIM usage rights among the wireless communication devices according to the second embodiment;

FIG. 22 is a diagram illustrating an example of determination standards regarding transfer of MCIM usage rights among the wireless communication devices according to a third embodiment;

FIG. 24 is a sequence chart illustrating a communication processing example between devices making up the communication system according to the third embodiment.

DETAILED DESCRIPTION OF EMBODIMENTS

Embodiments for carrying out the present technology will be described hereinafter. Description will be made in the following order.

1. First Embodiment (communication control: an example of performing transfer processing of usage rights of an MCIM (Machine Communication Identity Module), based on priority order that has been set to the wireless communication devices)

2. Second Embodiment (communication control: an example of performing transfer processing of MCIM usage rights taking into consideration authorization at a wireless communication device of which the priority order is higher)

3. Third Embodiment (communication control: an example of performing transfer processing of MCIM usage rights taking into consideration an appeal from a wireless communication device of which the priority order is lower)

1. First Embodiment

Usage Example of Wireless Communication Device

Figure 1A:
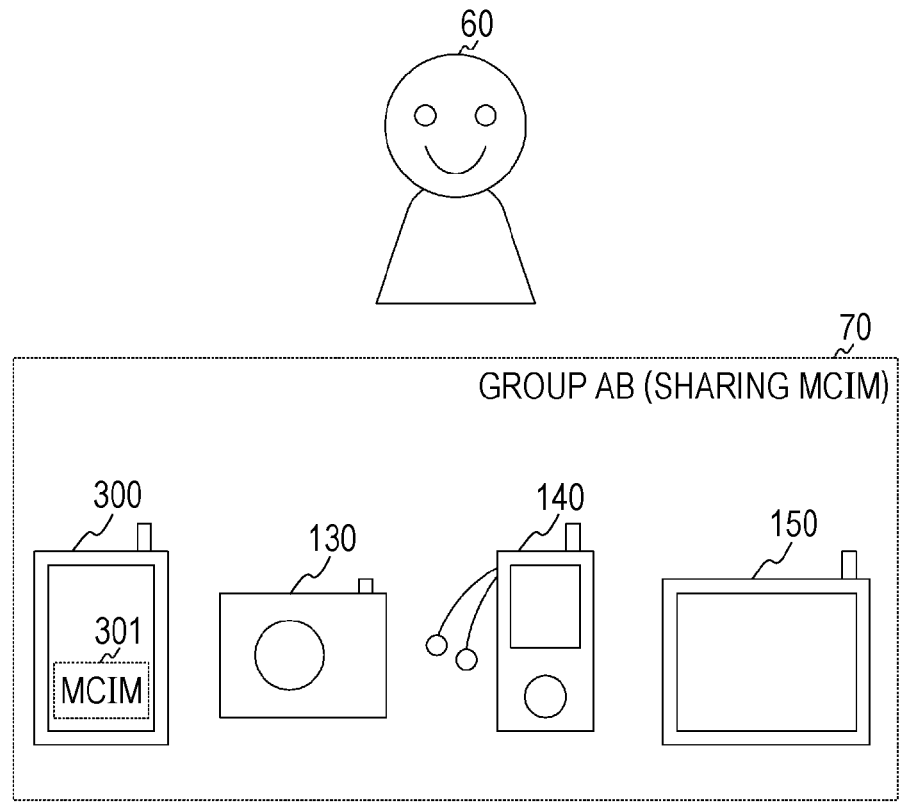
FIGS. 1A and 1B are simplified diagrams illustrating a usage example of multiple wireless communication devices according to a first embodiment.
Figure 1B:
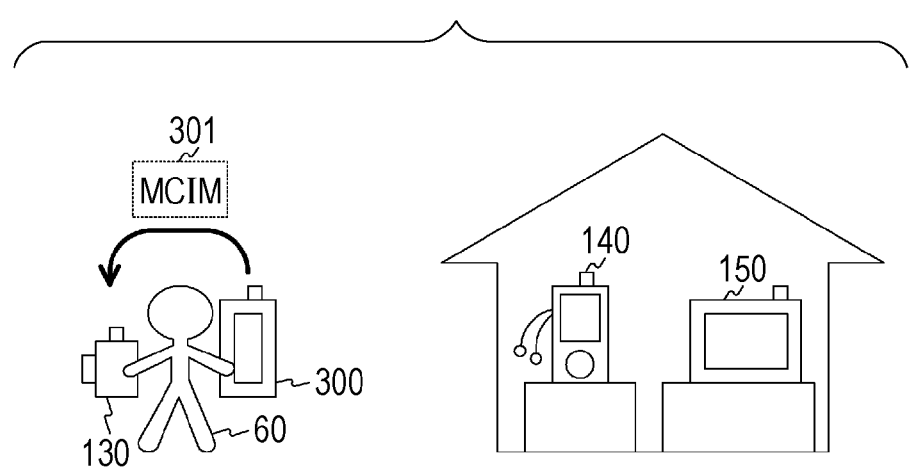

FIGS. 1A and 1B are diagrams schematically illustrating a usage example of multiple wireless communication devices according to a first embodiment. Shown in FIG. 1A are four wireless communication devices (a first wireless communication device 300, a second wireless communication device 130, a third wireless communication device 140, and a fourth wireless communication device 150) which a user 60 has.

The first wireless communication device 300 is, for example, a cellular telephone device (e.g., a smartphone having call functions and data communication functions). The second wireless communication device 130 is, for example, an imaging apparatus having wireless communication functions (e.g., a digital still camera or digital video camera (camcorder)). The third wireless communication device 140 is, for example, an audio output device having wireless communication functions (e.g., a portable music player). The fourth wireless communication device 150 is, for example, a display device having wireless communication functions (e.g., a digital photo frame).

These wireless communication devices are examples of wireless communication devices which can use a software-downloadable SIM (Subscriber Identity Module). This can also be applied to other wireless communication devices which can use a software-downloadable SIM (e.g., an e-book reader having wireless communication functions). Also, this can be applied to an information processing device capable of performing wireless communication by being mounted with wireless communication equipment having wireless communication functions (e.g., a personal computer without wireless communication functions), for example. Note that the first wireless communication device 300, the second wireless communication device 130, the third wireless communication device 140, and the fourth wireless communication device 150 are examples of information processing devices according to an embodiment of the disclosure.

Also, we will say that these four wireless communication devices belong to a group (group name: group AB) sharing connection rights for connecting to a predetermined network. The connection rights can be understood as usage rights of an MCIM (Machine Communication Identity Module), for example.

Now, an MCIM is an example of subscriber authentication information. Subscriber authentication information is information including telephone subscriber (Subscriber) information and authentication key (Authentication) information. An MCIM is subscriber authentication information which is not restricted to a particular communication carrier (e.g., cellular phone carrier) at the time of purchasing a device, and the communication carrier can be flexibly set after purchasing (also known as a "soft SIM"). Enabling MCIMs to be rewritten over a network facilitates separation between sales of cellular phones and selection of communication carriers, and further facilitates sharing of subscriber authentication information between multiple wireless communication devices. Also, not having MCIM usage rights implies a case of not having an MCIM itself, or a case of only having an invalidated MCIM which has been invalidated by MCIM invalidation processing, for example.

FIG. 1B illustrates a case of taking a photograph using the second wireless communication device 130, in a simplified manner. Here, we can assume that it would be relatively seldom for the second wireless communication device 130 (e.g., a camera) to connect to a network such as the Internet and perform communication processing. Accordingly, the second wireless communication device 130 does not have to be constantly connected to a network such as the Internet. An assumed example of the second wireless communication device 130 connecting to a network such as the Internet would involve photographs first being taken at an event such as a field day or the like, following which the second wireless communication device 130 is connected to a network such as the Internet in order to upload the photographs to a content server (not shown).

That is to say, a device such as the second wireless communication device 130 (e.g., a camera) will often be used in a manner where the connection state to a network is normally a limited connection state, and occasionally MCIM usage rights are temporarily used as suitable. Also, this can be conceived to be the same for devices such as the third wireless communication device 140 and the fourth wireless communication device 150 as well.

Thus, by the user 60 operating the wireless communication devices making up the group AB, the usage rights of the MCIM can be appropriated to any wireless communication device belonging to the group AB. However, a wireless communication device to which the MCIM usage rights are not appropriated will not be able to use communication functions based on the MCIM, so there will be many restrictions related to operations. Also, if one wireless communication device transfers the MCIM usage rights to another wireless communication device, it is likely that the wireless communication device which has transferred the MCIM usage rights to the other may not be able to continue particular processing.

For example, we will say that the user 60 normally uses the first wireless communication device 300 often, so the MCIM usage rights will be held at the first wireless communication device 300. Accordingly, in the event of performing communication processing at another wireless communication device, the MCIM usage rights are manually transferred by the user 60.

However, there may be cases conceived where the user 60 erroneously performs operations, resulting in the MCIM usage rights being cancelled from the first wireless communication device 300 unintended by the user 60, or the MCIM usage rights being appropriated to an unintended wireless communication device. Accordingly, with the first embodiment, an example will be illustrated in which priority order (priority) is set to the wireless communication devices making up the group, and the MCIM usage rights are appropriately shared between the multiple wireless communication devices using this priority order.

Configuration Example of Communication System

Figure 2A:
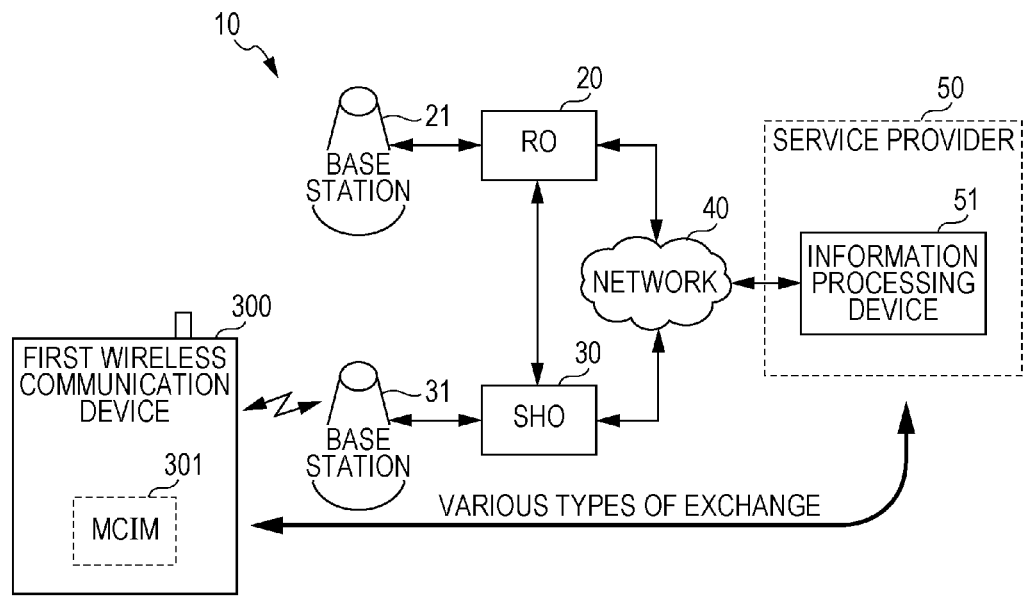
FIGS. 2A and 2B are block diagrams illustrating system configuration examples of a communication system according to the first embodiment.
Figure 2B:
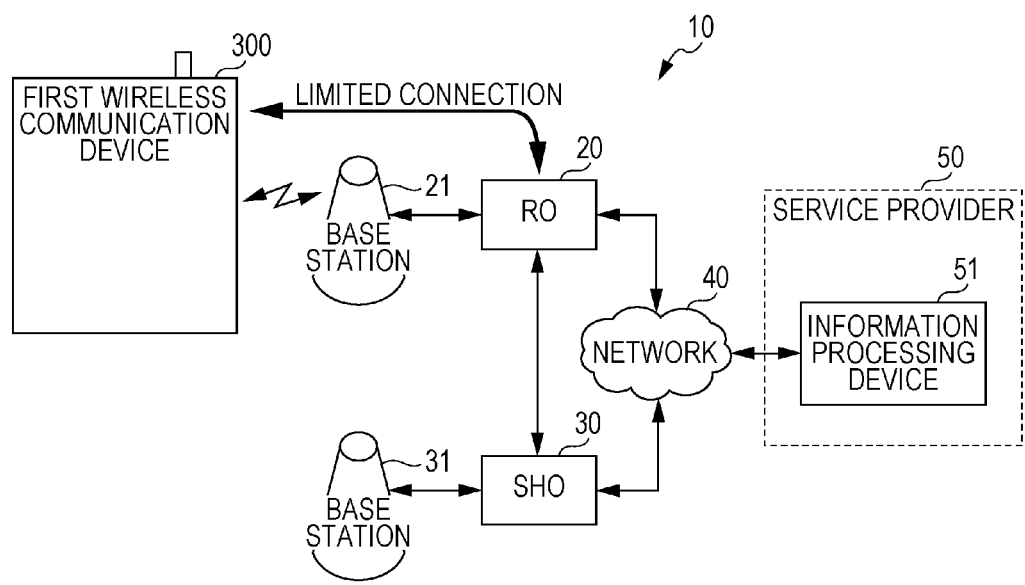

FIGS. 2A and 2B are block diagrams illustrating system configuration examples of a communication system 10 according to the first embodiment. FIGS. 2A and 2B illustrate configuration examples of a communication system in a case of assuming a network configuration made up of a SHO (Selected Home Operator) and RO (Registration Operator) (e.g., see 3GPP TR 33.812 V9.2.0 (2010-06)).

Also, FIG. 2A illustrates a wireless communication example in a case of the first wireless communication device 300 holding a valid MCIM (MCIM usage rights) 301, whereas FIG. 2B illustrates a wireless communication example in a case of the first wireless communication device 300 not holding a valid MCIM (MCIM usage rights) 301. The communication system 10 has an RO 20, an SHO 30, base stations 21 and 31, a network 40, an information processing device 51, and the first wireless communication device 300.

Here, RO and SHO indicate logical roles, and are assumed to be operated by different carriers, but may also be assumed to be operated by the same carrier. Also, there may be a plurality of each of RO and SHO. Further, each of RO and SHO may be integrally configured as an information processing device, or may configured of multiple devices. Note that RO and SHO mean relative roles when considering the arrangement from the basis of a wireless communication device having a valid MCIM. Accordingly, an entity which corresponds to RO when viewed from one wireless communication device may correspond to SHO when viewed from another wireless communication device.

As shown in FIG. 2A, in the event that the first wireless communication device 300 has a valid MCIM (MCIM usage rights) 301, the first wireless communication device 300 can connect to the SHO 30 via the base station 31 based on the MCIM 301. On the other hand, as shown in FIG. 2B, in the event that the first wireless communication device 300 does not have a valid MCIM (MCIM usage rights) 301, the first wireless communication device 300 is not able to connect to the SHO 30. However, in this case, the first wireless communication device 300 can connect to the RO 20 based on PCID (Provisional Connectivity Identity) via the base station 21. Now, PCID is an identifier (e.g., terminal identification information 225 on the network shown in FIG. 4) for connecting to RO, and is provided to all wireless communication devices having the software-downloadable SIM arrangement.

The network 40 is a network such as a telephone network, the Internet, or the like (e.g., public line network). Also, the network 40 and SHO 30 are connected via a gateway (not shown). In the same way, the network 40 and RO 20 are connected via a gateway (not shown).

The RO 20 so is a communication control device which is managed by a wireless carrier providing services such as initial connection registration and so forth. The RO 20 corresponds to a wireless carrier providing wireless connection services (e.g., a cellular phone carrier). The RO 20 also has a control unit (not shown).

The control unit of the RO 20 performs authentication control of wireless communication devices connected via the base station 21. For example, the control unit of the RO 20 performs authentication based on PCID for wireless communication devices connected via the base station 21. The RO 20 also provides services such as initial connection registration and so forth for the authenticated wireless communication devices. Also, the control unit of the RO 20 is connected to the SHO 30 and exchanges various types of information with the SHO 30.

The base station 21 is a mobile communication base station (Node B) which connects the first wireless communication device 300 and RO 20 by wireless line.

The SHO 30 is a communication control device managed by a wireless carrier providing wireless connection services. The SHO 30 provides Internet services and the like, and corresponds to a wireless carrier providing wireless connection services (e.g., a cellular phone carrier), for example. The SHO 30 also has a control unit (not shown).

The control unit of the SHO 30 performs authentication control of the wireless communication devices connected via the base station 31. For example, the control unit of the SHO 30 authenticates, of the wireless communication devices connected via the base station 31, wireless communication devices holding a valid MCIM (subscriber authentication information) of the SHO 30. The SHO 30 connects authenticated wireless communication devices to the network 40 via a gateway (not shown).

Also, the control unit of the SHO 30 is connected to the RO 20 and exchanges various types of information with the RO 20. Now, wireless communication devices which do not have a valid MCIM (subscriber authentication information) can connect to the RO 20 via the SHO 30 based on the PCID of the wireless communication device itself (limited connection).

The base station 31 is a mobile communication base station (Node B) which connects the first wireless communication device 300 and SHO 30 by wireless line.

A service provider 50 (sometimes abbreviated to simply "SP") is a corporation which provides various types of communication services, such as content saving services, content distribution services, and so forth. The service provider 50 has an information processing device 51 for providing these communication services. The information processing device 51 is also connected to the RO 20 and SHO 30 via the network 40. Here, the operator performing various types of communication services is assumed to be a communication carrier providing wireless connection services, an MVNO (Mobile Virtual Network Operator), or the like.

The information processing device 51 is an information processing device which provides various types of communication services via the network 40, providing various types of communication services to the first wireless communication device 300 using wireless communication. The information processing device 51 provides various types of communication services such as, for example, Web services, data download services, data upload services, online gaming, and so forth.

For example, as shown in FIG. 2A, in the event that the first wireless communication device 300 has a valid MCIM 301, the first wireless communication device 300 is connected to the base station 31 via the wireless line based on the MCIM 301, and is connected to the SHO 30 via the base station 31. In this case, the first wireless communication device 300 is connected to the SHO 30 via the base station 31, and can be provided with various types of services (e.g., downloading contents) from the information processing device 51. Also, in the event of a first wireless communication device 300 having a valid MCIM 301 connecting to the RO 20, this connection is made to the RO 20 via the SHO 30.

Also, as shown in FIG. 2B, in the event that the first wireless communication device 300 does not have a valid MCIM 301, the first wireless communication device 300 can connect to the RO 20 via the base station 21 based on the PCID it holds (limited connection). In this case, the first wireless communication device 300 is connected to the RO 20 via the base station 21 (limited connection) but can only perform limited communication (e.g., MCIM downloading, MCIM validation/invalidation).

Note that in the event that the first wireless communication device 300 does not have a valid MCIM 301, the first wireless communication device 300 can connect to either of the base stations 21 and 31 depending on the position at which it is being used, and is connected to the RO 20 via these base stations.

In this way, the first wireless communication device 300 not having a valid MCIM 301 is not able to receive various types of services from the information processing device 51. That is to say, a wireless communication device not having MCIM usage rights can be understood as being a device connected with limited services (RO Connected Device). On the other hand, a wireless communication device having MCIM usage rights can be understood as being a device (SHO Connected Device) with service connection (normal connection). Note that a wireless communication device not having MCIM usage rights can be understood as being a device can connect to the SHO 30 by obtaining MCIM usage rights via the RO 20 (e.g., MCIM download or MCIM validation). This is the same for the second wireless communication device 130, third wireless communication device 140, and fourth wireless communication device 150 as well.

Configuration Example of Communication System

FIG. 3 is a block diagram illustrating a system configuration example of the communication system 100 according to the first embodiment. The communication system 100 includes a network 110, base stations 121, 122, and 206, and the first wireless communication device 300, second wireless communication device 130, third wireless communication device 140, and fourth wireless communication device 150. The communication system 100 also includes a communication control device (second communication carrier) 120 and a communication control device (first communication carrier) 200.

Now, the communication system 100 is a system corresponding to the communication system 10 shown in FIGS. 2A and 2B. Specifically, the communication control device (second communication carrier) 120 corresponds to the SHO 30 shown in FIGS. 2A and 2B, and the communication control device (first communication carrier) 200 corresponds to the RO 20 shown in FIGS. 2A and 2B. In this example, description of the parts which are the same as with the communication system 10 shown in FIGS. 2A and 2B will be partially omitted.

The network 110 is a network such as a telephone network, the Internet, or the like (e.g., public line network). Also, the network 110 and communication control device (second communication carrier) 120 are connected via a gateway (not shown). In the same way, the network 110 and communication control device (first communication carrier) 200 are connected via a gateway (not shown).

The communication control device (second communication carrier) 120 is a communication control device managed by a wireless carrier providing wireless connection services, and corresponds to the SHO 30 shown in FIGS. 2A and 2B. That is to say, the communication control device (second communication carrier) 120 provides Internet services and the like, and corresponds to a wireless carrier providing wireless connection services (e.g., a cellular phone carrier), for example. Also, the communication control device (second communication carrier) 120 has a control unit 125. The communication control device (second communication carrier) 120 is an example of an information processing device according to an embodiment of the disclosure.

The control unit 125 performs authentication control of wireless communication devices connected via the base stations 121 and 122. For example, of the wireless communication devices connected via the base stations 121 and 122, the communication control device (second communication carrier) 120 authenticates wireless communication devices having a valid MCIM (subscriber authentication information). The communication control device (second communication carrier) 120 then connects the authenticated wireless communication devices to the network 110 via a gateway (not shown).

Also, the control unit 125 is connected to the communication control device (first communication carrier) 200 and exchanges various types of information with the communication control device (first communication carrier) 200. Now, a wireless communication device which does not hold a valid MCIM (subscriber authentication information) can connect to the communication control device (first communication carrier) 200 via the communication control device (second communication carrier) 120 (limited connection). Also, in the event of receiving an MCIM transfer request from a wireless communication device, the control unit 125 transmits that transfer request to the communication control device (first communication carrier) 200.

The base stations 121 and 122 are mobile communication base stations (Node B) which connect the first wireless communication device 300, second wireless communication device 130, third wireless communication device 140, fourth wireless communication device 150, and communication control device (second communication carrier) 120 via a wireless line.

For example, with the communication system 100, a wireless communication device having a valid MCIM is connected with the base stations 121 and 122 via a wireless line, and is connected to the communication control device (second communication carrier) 120 via the base stations 121 and 122. Also, in the event of the wireless communication device having a valid MCIM connecting to the communication control device (first communication carrier) 200, connection to the communication control device (first communication carrier) 200 is made via the communication control device (second communication carrier) 120.

Also, a wireless communication device not having a valid MCIM can connect to the communication control device (first communication carrier) 200 via the base station 206 based on the PCID of the wireless communication device itself (limited connection). A wireless communication device not having a valid MCIM can connect with any of the base stations 121, 122, and 206, depending on the position where it is being used, and is connected with the communication control device (first communication carrier) 200 via these base stations.

The communication control device (first communication carrier) 200 is a communication control device managed by a wireless carrier providing services such as initial connection registration and so forth, and corresponds to the RO 20 illustrated in FIGS. 2A and 2B. The communication control device (first communication carrier) 200 corresponds to a wireless carrier providing wireless connection services (e.g., a cellular phone carrier), for example. Also, the communication control device (first communication carrier) 200 has a control unit 205, a control unit 210, a group management database 220, and setting unit 230.

The control unit 205 performs transmission/reception of various types of information under the control of the control unit 210. The control unit 205 is connected to the communication control device (second communication carrier) 120 and base station 206 for example, and performs transmission/reception of various types of information between wireless communication devices connected via these.

The control unit 210 performs various types of control relating to the wireless communication devices connected via the control unit 205 (or the control unit 205 and communication control device (second communication carrier) 120). For example, the control unit 210 obtains information relating to a group configured of multiple wireless communication devices sharing MCIM usage rights (group information) from the group management database 220. The control unit 210 then supplies that group information to the wireless communication devices via the control unit 205 and communication control device (second communication carrier) 120.

By transferring MCIM usage rights (the right to use an MCIM) between multiple wireless communication devices, an MCIM can be shared between multiple wireless communication devices. In this case, the multiple wireless communication devices relating to this sharing can be set as one group. This group can be managed by the group management database 220.

This group is a group sharing connection rights (network connection rights). The connection rights are rights for connecting to a predetermined network (e.g., network 110) using wireless communication, and correspond to MCIM usage rights, for example. That is to say, connection rights are rights for connecting, based on an MCIM (subscriber authentication information) for connecting to a base station operated by a communication carrier, to that base station. Also, for example, whether or not there are connection rights corresponds to whether or not there are MCIM usage rights.

The group management database 220 is a database for managing groups configured of the multiple wireless communication devices sharing an MCIM. Also, the group management database 220 correlates the multiple wireless communication devices and priority order (priority) for each wireless communication device and stores in increments of group. The group management database 220 will be described later in detail with reference to FIG. 4. Note that the group management database 220 is an example of a storage unit according to an embodiment of the disclosure.

The setting unit 230 sets priority of the multiple wireless communication devices sharing the MCIM, based on user operations or predetermined rules, under the control of the control unit 210. For example, priority order of each wireless communication device is set as priority. Setting of this priority will be described in detail with reference to FIG. 6.

Description will be made regarding an example of transfer of MCIM usage rights with the communication system 100 (example of transfer of network connection rights). For example, let us say that an MCIM is held at each wireless communication device. The communication control device (second communication carrier) 120 then performs validation/invalidation of the MCIM held at each wireless communication device based on instructions from the control unit 210, thereby transferring the MCIM usage rights among the wireless communication devices. Note that validation/invalidation of the MCIM held by the wireless communication devices can also performed at the communication control device (first communication carrier) 200 side as well. Accordingly, an arrangement may be made where the MCIM usage rights are transferred by the control unit 210 performing the validation/invalidation of the MCIM held at each wireless communication device.

Also, an arrangement may be made where MCIM usage rights are transferred by transferring the MCIM itself, rather than each wireless communication device holding an MCIM. For example, let us assume a case where MCIM usage rights are transferred from the first wireless communication device 300 to the second wireless communication device 130. An MCIM transfer request is transmitted from the first wireless communication device 300 to the control unit 210, for example. In this case, the MCIM held at the first wireless communication device 300 is invalidated (erased) by the communication control device (second communication carrier) 120, based on an instruction from the control unit 210. Also, setting information (including the MCIM) is transmitted from the communication control device (second communication carrier) 120 to the second wireless communication device 130 via the control unit 210. By holding the MCIM included in this setting information in the second wireless communication device 130, a valid MCIM is set in the second wireless communication device 130. Note that transmission of the setting information (including MCIM) to the wireless communication devices can be performed at the communication control device (first communication carrier) 200 side as well. Accordingly, an arrangement may be made wherein MCIM usage rights are transferred by the control unit 210 transferring the setting information (including MCIM) to the wireless communication devices.

In this way, the communication system 100 is a wireless communication system having wireless communication devices regarding which subscriber authentication information can be rewritten over a network. Also, the communication system 100 is a wireless communication system where subscriber authentication information can be shared between multiple wireless communication devices, and connection rights can be assigned to a suitable wireless communication device based on priority order (priority) set to each wireless communication device. That is to say, in the event of transferring connection rights using wireless communication between the multiple wireless communication devices, the transfer is performed based on the priority set for the wireless communication devices regarding which the transfer is to be performed.

Also, in the event of having accepted an MCIM transfer request, the control unit 210 effects control for transfer of the connection rights between the wireless communication devices, based on the priority set to the wireless communication devices relating to the transfer request.

Configuration Example of Group Management Database

Figure 4:
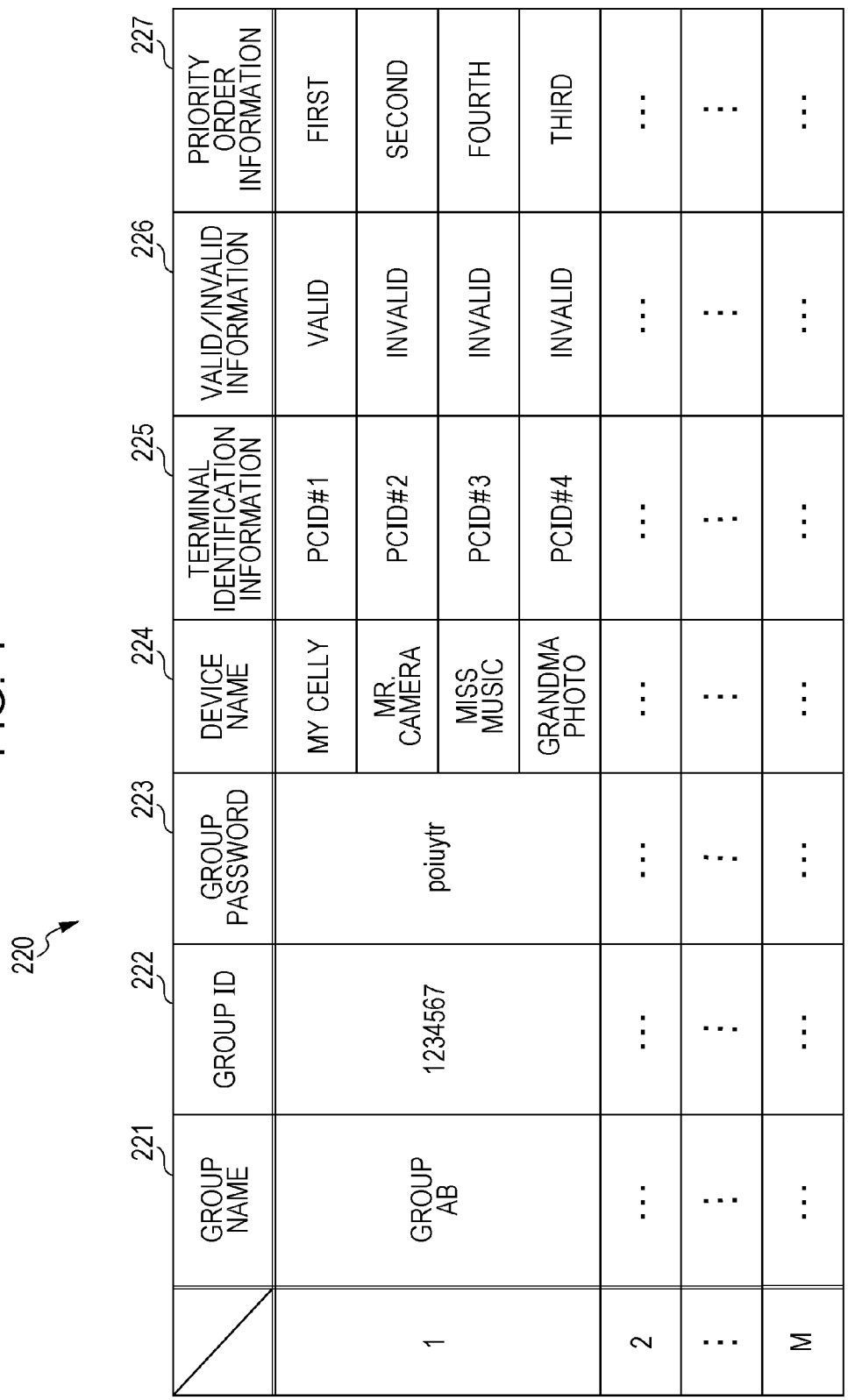
FIG. 4 is a diagram schematically illustrating a group management database according to the first embodiment.

FIG. 4 is a diagram schematically illustrating the group management database 220 according to the first embodiment. FIG. 4 illustrates a case where the first wireless communication device 300, second wireless communication device 130, third wireless communication device 140, and fourth wireless communication device 150 are registered in the group AB.

The group management database 220 stores a group name 221, a group ID 222, a group password 223, a device name 224, a terminal identification information 225, a valid/invalid information 226, and a priority order information 227, in group increments. These information are sequentially updated by the control unit 210 based on the requests (add-to-group request, delete-from-group request) from the wireless communication devices, for example.

The group name 221 stores the name given to the group. This name is stored at the time of creating the group, for example.

The group ID 222 stores an ID given to the group, and group password 223 stores a password given to the group.

The ID and password are used to make an add-to-group request to newly add a wireless communication device to the group, for example. Also, the wireless communication devices belonging to the group may store the ID and password given to that group (e.g., stored in memory 340 shown in FIG. 5). Also, the ID and password may be input by the user each time, rather than being stored in the wireless communication devices.

The device name 224 stores the name given to the wireless communication device. This name is stored at the time of additionally registering a wireless communication device to the group, for example.

The terminal identification information 225 stores a the terminal identification number of the wireless communication device. The terminal identification information 225 is identification information for identifying the wireless communication device, with a PCID being stored, for example. Also, in FIG. 4, we will say that "PCID#1" of the terminal identification information 225 corresponds to the first wireless communication device 300. In the same way, we will say that the "PCID#2" of the terminal identification information 225 corresponds to the second wireless communication device 130, the "PCID#3" of the terminal identification information 225 corresponds to the third wireless communication device 140, and the "PCID#4" of the terminal identification information 225 corresponds to the fourth wireless communication device 150.

The valid/invalid information 226 stores information indicating whether the MCIM is valid at the wireless communication device or invalid (or the MCIM is not held there). Note that with FIG. 4, the wireless communication device where the MCIM is valid is indicated by "valid", and the wireless communication devices where the MCIM is invalid are indicated by "invalid", to facilitate understanding.

The priority order information 227 stores in formation indicating the priority order (priority) set to the wireless communication devices making up the group. This priority order is set by user operations, using a priority order setting screen 400 shown in FIG. 6, for example. Alternatively, the setting unit 230 may automatically set the priority order based on a predetermined rule. For example, the priority order may be set in accordance with the usage frequency of the wireless communication functions of each wireless communication device. Also, in the event of using the wireless communication devices making up the group with multiple users for example, an arrangement may be made where votes are accepted from the multiple users, with the priority order being set in accordance to the results of tallying the votes. Note that with FIG. 4, the priority order information is illustrated in simple terms of first, second, and so forth.

In this way, a group configured of multiple wireless communication devices sharing an MCIM is managed at the group management database 220. Note that with the first embodiment, description will be made assuming that MCIM transfer processing is performed among the wireless communication devices belonging to the same group.

Now, description will be made regarding an example of adding a new wireless communication device to a group configured of multiple wireless communication devices sharing an MCIM. For example, a new wireless communication device can be added to the group by performing additional registration operations at the new wireless communication device to be added. In this case, an arrangement may be made where the new wireless communication device is additionally registered to that group under the condition that an authorization operation of the additional registration thereof has been performed at one or multiple wireless communication devices registered to that group, other than the new wireless communication device.

While description of the embodiments of the present technology will be made regarding a case of sharing one MCIM per group configured of multiple wireless communication devices to facilitate understanding, this may be applied to sharing of multiple MCIMs in the same way.

That is to say, this may be applied to a case of sharing N MCIMs in a group of M wireless communication devices (where M>N).

Configuration Example of Wireless Communication Device

Figure 5:
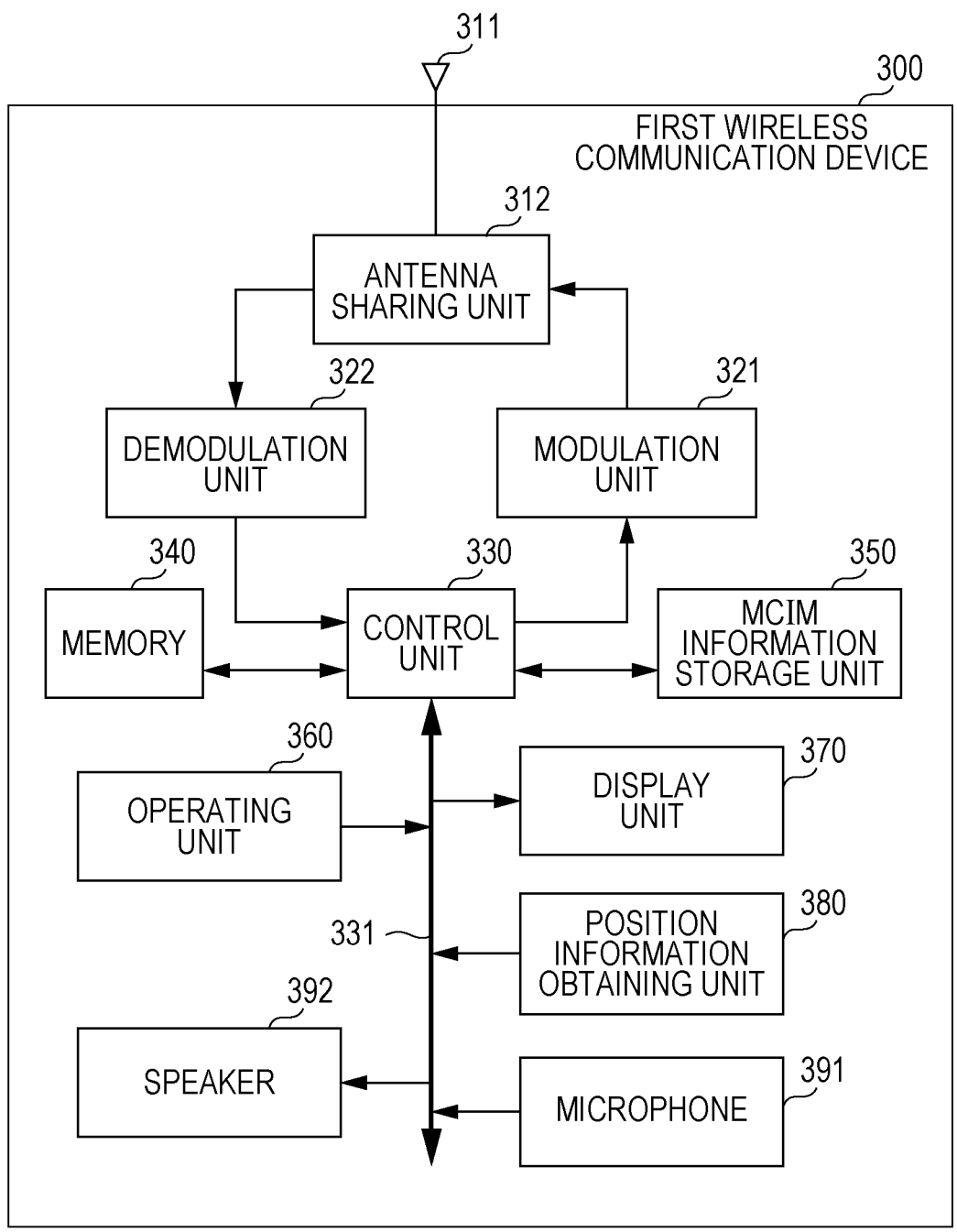
FIG. 5 is a block diagram illustrating an internal configuration example of a first wireless communication device according to the first embodiment.

FIG. 5 is a block diagram illustrating an internal configuration example of the first wireless communication device 300 according to the first embodiment. Note that internal configuration regarding wireless communication functions is the same as with the first wireless communication device 300 for the second wireless communication device 130, third wireless communication device 140, and fourth wireless communication device 150 as well, so description thereof will be omitted. Also, in the event of making description with regard to the second wireless communication device 130, third wireless communication device 140, or fourth wireless communication device 150 in FIG. 6 or subsequent drawings, parts corresponding to those in the first wireless communication device 300 will be denoted with the same names and same reference numerals.

The first wireless communication device 300 includes an antenna 311, an antenna sharing unit 312, a modulating unit 321, a demodulating unit 322, a control unit 330, memory 340, and an MCIM information storage unit 350. The first wireless communication device 300 also includes an operating unit 360, a display unit 370, a position information obtaining unit 380, a microphone 391, and a speaker 392. These parts are connected by a bus 331. The first wireless communication device 300 is realized by a cellular phone device capable of calls and data communication, for example.

For example, in the event that reception processing is performed, airwaves received by the antenna 311 are passed through the antenna sharing unit 312 and demodulated at the demodulating unit 322, and the demodulated received data is supplied to the control unit 330. In the event that the reception processing is call reception processing, the demodulated received data (audio data) is output from the speaker 392 via the control unit 330 as audio.

Also, in the event that transmission processing is performed for example, transmission data output from the control unit 330 is modulated by the modulating unit 321, and the modulated transmission data is output from the antenna 311 via the antenna sharing unit 312. In the event that the transmission processing is call transmission processing, audio data input from the microphone 391 passes through the control unit 330 and is modulated at the modulating unit 321, and the modulated transmission data (audio data) is transmitted from the antenna 311 via the antenna sharing unit 312.

The control unit 330 effects control of various types based on a control program stored in the memory 340. The control unit 330 is configured of a microprocessor, for example. The control unit 330 is connected to the modulating unit 321 and demodulating unit 322, so as to perform transmission/reception of various types of data with the communication control device (second communication carrier) 120 via the base stations 121 and 122, for example. Also, the control unit 330 performs connection processing of connecting with the communication control device (first communication carrier) 200 via wireless line without using MCIM, by limited connection based on PCID, for example. Note that the control unit 330 is an example of a setting unit and control unit according to an embodiment of the disclosure.

The memory 340 is memory storing control programs for the control unit 330 to perform various types of control, transmission data, reception data, and so forth. The memory 340 is configured of ROM (Read Only Memory) and RAM (Random Access Memory), for example. Also, the memory 340 stores terminal identification information (PCID#1) for identifying the first wireless communication device 300, and the device name of the first wireless communication device 300 (e.g., the device name 224 illustrated in FIG. 4). This device name is registered by user operations, for example. Also, the memory 340 stores an ID and password given to the group AB to which the first wireless communication device 300 belongs (e.g., the group ID 222 and group password 223 shown in FIG. 4). The group ID and password are transmitted from the communication control device (first communication carrier) 200 included in group addition authentication results corresponding to an add-to-group request, and stored in the memory 340.

The MCIM information storage unit 350 is memory holding the MCIM (subscriber authentication information). For example, a UICC (Universal Integrated Circuit Card) may be used as the MCIM information storage unit 350, or alternatively, dedicated memory may be used to securely hold the MCIM. In the event of using a UICC as the MCIM information storage unit 350, a UICC which is capable of validation processing and invalidation processing of the MCIM is used, and not one where the MCIM is fixedly written. That is to say, a UICC regarding which the control unit 330 can perform validation processing and invalidation processing of the MCIM based on transfer information received by the antenna 311 and demodulated, is used. Also, validation processing and invalidation processing of the MCIM can be performed according to the validation processing and invalidation processing stipulated in 3GPP (Third Generation Partnership Project). Also, the MCIM information storage unit 350 may be provided within the memory 340 by securing a secure region in the memory 340.

The operating unit 360 is an operation accepting unit which accepts operation input by user operations, and outputs signals corresponding to the operation input that has been accepted to the control unit 330. The operating unit 360 has various keys such as alphanumeric keys and so forth.

The display unit 370 is a display unit which displays various types of information (text information, point-in-time information, etc.) under control of the control unit 330. The display unit 370 displays information for performing various types of settings (e.g., the display screens shown in FIGS. 6 and 7), for example. Examples of display panels which can be used as the display unit 370 include organic EL (Electro Luminescence) panels, LCD (Liquid Crystal Display) panels, and so forth. Also note that the operating unit 360 and display unit 370 may be integrally configured using a touch panel where the user can perform operation input by touching with a finger or bringing the finger into close proximity with the display screen.

The position information obtaining unit 380 obtains position information indicating the position where the first wireless communication device 300 is, and outputs the obtained position information to the control unit 330. The position information obtaining unit 380 can be realized by a GPS (Global Positioning System) unit which calculates position information based in GPS signals received by a GPS signal reception antenna (not shown). The calculated position information includes data relating to latitude, longitude, altitude and so forth, at the time of receiving GPS signals. Also, a position information obtaining device which obtains position information by another position information obtaining method. For example, an arrangement may be made using a position information obtaining device which finds position information using access point information from a nearby wireless LAN (Local Area Network), and obtains this position information.

Display Example of Priority Order Setting Screen

Figure 6:
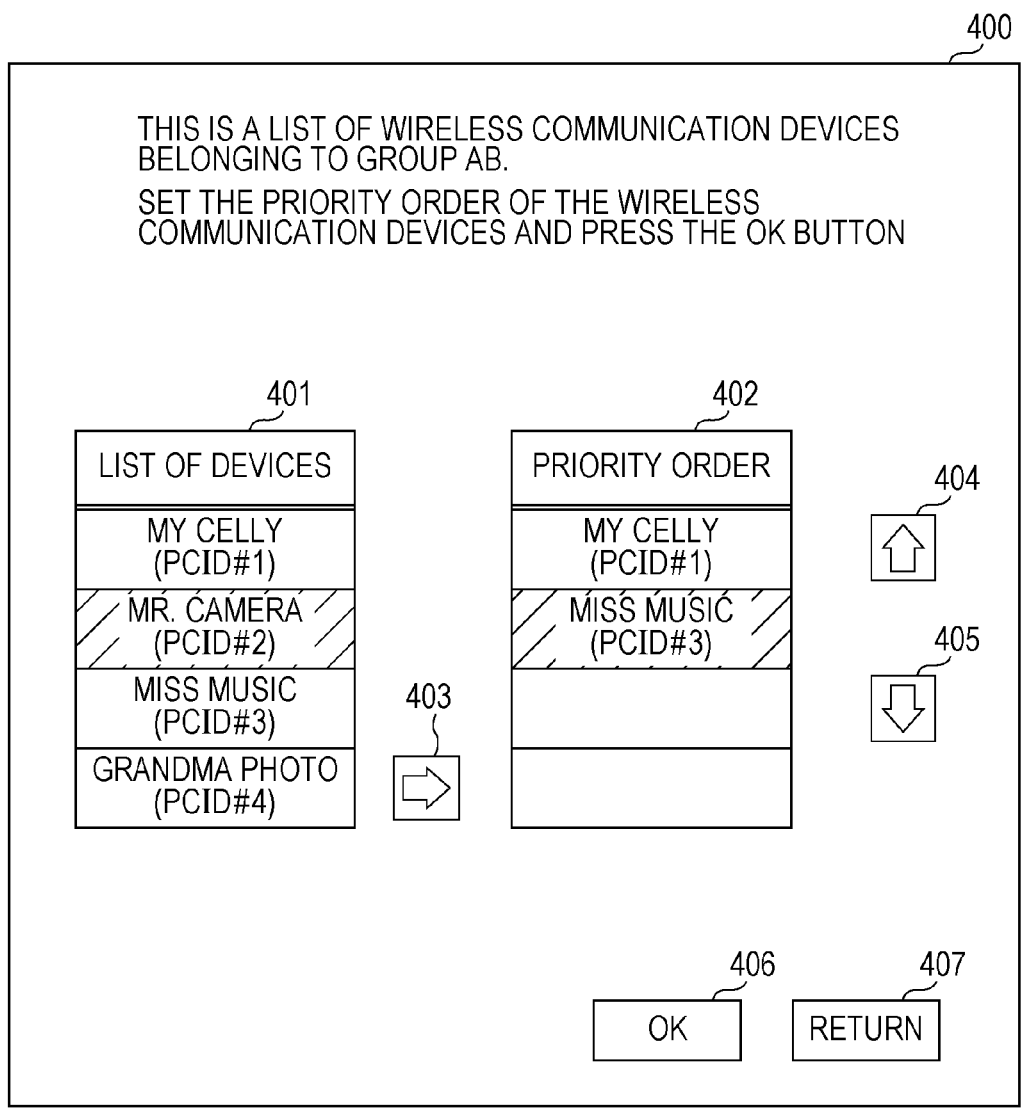
FIG. 6 is a diagram illustrating a display screen example (priority order setting screen) displayed on a display unit of the first wireless communication device according to the first embodiment.

FIG. 6 is a diagram illustrating an example of a display screen example (priority order setting screen 400) displayed on the display unit 370 of the first wireless communication device 300 according to the first embodiment.

The priority order setting screen 400 is a display screen for performing setting operations to set the priority order of wireless communication devices making up the group AB. The priority order setting screen 400 is displayed based on information transmitted from the communication control device (first communication carrier) 200 in accordance with user operations made at the first wireless communication device 300, for example. The group password and group ID of the group AB are input by user operations at a display screen (displayed on the display unit 370 of the first wireless communication device 300) for making a display request for the priority order setting screen 400, for example. The communication control device (first communication carrier) 200 performs authentication processing regarding the input group password and group ID. In the event that authentication is made by the authentication processing, the communication control device (first communication carrier) 200 transmits information to the first wireless communication device 300 to display the priority order setting screen 400.

The priority order setting screen 400 includes a device list display region 401, a priority order display region 402, arrow buttons 403 through 405, an OK button 406, and a return button 407.

The device list display region 401 is a region for displaying a list of the wireless communication devices making up the group AB. The priority order display region 402 is a region for displaying a list of the wireless communication devices making up the group AB according to the priority order thereof. That is to say, the priority order display region 402 displays a list of the wireless communication devices making up the group AB in accordance with the priority order set by user operations.

The arrow buttons 403 through 405 are buttons used at the time of performing setting operations of the priority order of the wireless communication devices making up the group AB. Specifically, the arrow button 403 is a button for displaying, in the priority order display region 402, wireless communication devices displayed in the device list display region 401 (the wireless communication devices making up the group AB).

Here in FIG. 6, an example is illustrated where, of the four wireless communication devices displayed in the device list display region 401, two wireless communication devices (first wireless communication device 300 and third wireless communication device 140) are displayed in the priority order display region 402. In this case, the user sets, of the wireless communication devices displayed on the device list display region 401, the second wireless communication device 130 (Mr. Camera) for example, to a selected state (e.g., a state displayed in a different color), and presses the arrow button 403, whereupon the second wireless communication device 130 (Mr. Camera) is displayed in the priority order display region 402 at the lowest order (below the third wireless communication device 140 (Miss Music) displayed at the bottom) in the priority order display region 402.

Also, the arrow buttons 404 and 405 are buttons for switching the priority order of the wireless communication devices displayed in the priority order display region 402. For example, as shown in FIG. 6, the user sets, of the wireless communication devices displayed on the priority order display region 402, the third wireless communication device 140 (Miss Music) for example, to a selected state (e.g., a state displayed in a different color), and presses the arrow button 404, whereupon the third wireless communication device 140 (Miss Music) moves one up in the priority order display region 402. That is to say, each time the arrow button 404 is pressed, the priority order of the wireless communication device in a selected state goes up by one. On the other hand, each time the arrow button 405 is pressed, the priority order of the wireless communication device in the selected state goes down by one. Accordingly, in the event that either the arrow button 404 or 405 is pressed, the priority order is changed in the direction of the pressed button in accordance with the number of times pressed. That is to say, the priority order of the wireless communication devices displayed in the priority order display region 402 is sequentially changed in accordance with the pressing of the arrow buttons 404 and 405.

The OK button 406 is a button pressed at the time of finalizing the above-described operations (input operations) that have been made. That is to say, in the event that the OK button 406 is pressed, the priority order displayed in the priority order display region 402 (the priority order of wireless communication devices making up the group AB) is finalized. Also, in the event that the OK button 406 is pressed, the control unit 330 sends information relating to the priority order displayed in the priority order display region 402 to the communication control device (first communication carrier) 200. That is to say, the control unit 330 as a setting unit which performs these settings can comprehend the priority order based on user operations of a predetermined rule regarding the multiple wireless communication devices sharing the MCIM. Also, the setting unit 230 of the communication control device (first communication carrier) 200 stores the contents of the priority order setting information in the priority order information 227 of the group management database 220.

The return button 407 is a button pressed in the event of returning to the display screen displayed immediately before, for example. While an example is illustrated in FIG. 6 of the priority order being set using the first wireless communication device 300, an arrangement may be made where the wireless communication devices regarding which the priority order can be set (changed) are restricted following setting of the priority order. For example, an arrangement may be made wherein only the wireless communication device which is first in priority order has the right to set priority order. Also, an arrangement may be made wherein each wireless communication device has the right to set the priority order just for wireless communication devices lower in priority order than itself.

Display Example of Transfer Destination Setting Screen

Figure 7:
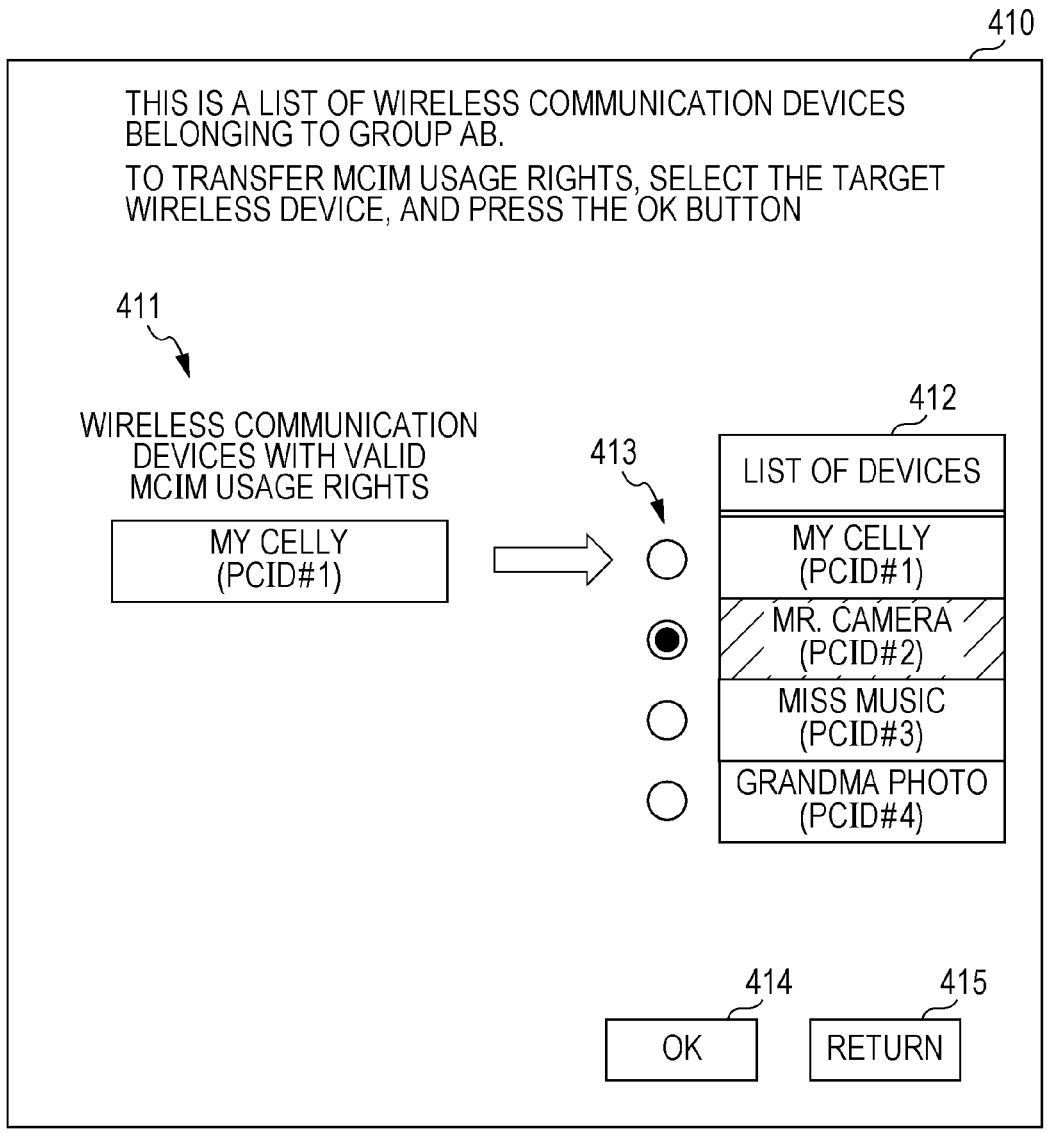
FIG. 7 is a diagram illustrating a display screen example (transfer destination setting screen) displayed on the display unit of the first wireless communication device according to the first embodiment.

FIG. 7 is a diagram illustrating a display screen (transfer destination setting screen 410) displayed on the display unit 370 of the first wireless communication device 300 according to the first embodiment. The transfer destination setting screen 410 is a display screen for displaying a list of information relating to the wireless communication devices belonging to the group (group information) and transfer MCIM usage rights. The transfer destination setting screen 410 is displayed in accordance to a selection operation at a display screen for selecting a function for the first wireless communication device 300 to execute (e.g., a menu screen), for example. Also, the transfer destination setting screen 410 is displayed based on the content of the group management database 220 of the communication control device (first communication carrier) 200.

Specifically, the transfer destination setting screen 410 includes a transfer source display region 411, a device list display region 412, a radio button display region 413, an OK button 414, and a return button 415.

The transfer source display region 411 displays name or the like representing the wireless communication device, which, of the wireless communication devices belonging to the group, holds the MCIM usage rights. For example, the device name and terminal identification (the device name 224 and terminal identification information 225 shown in FIG. 4) stored in the group management database 220 are displayed.

The device list display region 412 displays a list of names or the like representing the wireless communication devices belonging to the group. In the same way as with the transfer source display region 411, the device name and terminal identification (the device name 224 and terminal identification information 225 shown in FIG. 4) stored in the group management database 220 are displayed, for example.

The radio button display region 413 displays radio buttons whereby the transfer destination wireless communication device can be selected at the time of transferring the MCIM usage rights between the wireless communication devices making up the group. That is to say, one radio button is displayed in the radio button display region 413 for each wireless communication device displayed in the device list display region 412. For example, in the event that a selecting operation of a transfer destination wireless communication device is performed, the radio button in the radio button display region 413 corresponding to the selected wireless communication device is indicated with a black dot.

The OK button 414 is a button pressed after having performed an operation to transfer MCIM usage rights at the transfer destination setting screen 410, so as to finalize the operation. The return button 415 is a button pressed to return to the display screen displayed immediately before, for example.

Example of Determination Standards Relating to Transfer of MCIM Usage Rights

Now, we will assume a case where a transfer instruction operation of MCIM usage rights has been performed at the transfer destination setting screen 410 shown in FIG. 7. In that case, transfer processing is performed by the communication control device (first communication carrier) 200 in accordance with the transfer instruction operation. However, it can be conceived that the MCIM usage rights may be assigned to a wireless communication device which the user does not intend, due to erroneous operations or unintended operations by the user. Accordingly, with the present embodiment, whether or not to transfer MCIM usage rights is determined based on the wireless communication device performing the operations (operating device) and the superiority relation of the transfer source and the transfer destination wireless communication devices (superiority in priority order).

With the embodiments according to the present technology, three examples will be illustrated as determination standards at the time of determining whether or not to transfer MCIM usage rights.

(1) an example of determining whether or not to transfer the MCIM usage rights based on priority order alone (first embodiment)

(2) an example of determining whether or not to transfer the MCIM usage rights taking into consideration authorization from a higher order device (second embodiment)

(3) an example of determining whether or not to transfer the MCIM usage rights taking into an appeal from a lower order device (third embodiment)

FIG. 8 is a diagram illustrating an example of determination standards regarding transfer of MCIM usage rights between the wireless communication devices according to the first embodiment. FIG. 8 illustrates the relation between OPERATING DEVICE 421, TRANSFER MCIM USAGE RIGHTS FROM HIGHER ORDER DEVICE TO LOWER ORDER DEVICE 422, and TRANSFER MCIM USAGE RIGHTS FROM LOWER ORDER DEVICE TO HIGHER ORDER DEVICE 423.

The OPERATING DEVICE 421 indicates information relating to the priority order of the wireless communication device regarding which the transfer instruction operation is to be performed.

The TRANSFER MCIM USAGE RIGHTS FROM HIGHER ORDER DEVICE TO LOWER ORDER DEVICE 422 indicates whether or not transfer is permitted in the event that a MCIM usage rights transfer instruction operation is performed from a higher order wireless communication device to a lower order wireless communication device.

The TRANSFER MCIM USAGE RIGHTS FROM LOWER ORDER DEVICE TO HIGHER ORDER DEVICE 423 indicates whether or not transfer is permitted in the event that a MCIM usage rights transfer instruction operation is performed from a lower order wireless communication device to a higher order wireless communication device.

Thus, in the event that a MCIM usage rights transfer operation from a lower order wireless communication device to a higher order wireless communication device is performed, the MCIM usage rights are transferred in accordance to the transfer instruction operations. On the other hand, in the event that a MCIM usage rights transfer operation from a higher order wireless communication device to a lower order wireless communication device is performed, transfer of the MCIM usage rights in accordance to the transfer instruction operations is restricted. That is to say, transfer of the MCIM usage rights in accordance to the transfer instruction operations is carried out only in the event that of the two wireless communication devices which are the object of transfer, the wireless communication device performing the operation is the wireless communication device with higher order in priority order.

Now, let us assume a case where, as shown in FIG. 4 for example, the priority order set to the second wireless communication device 130 is lower than the priority order set to the first wireless communication device 300. In this case, upon having received an MCIM transfer request, the control unit 210 of the communication control device (first communication carrier) 200 effects control to transfer the MCIM usage rights between the wireless communication device, based on the priority order of the wireless communication devices involved in the transfer request.

For example, let us assume a case of having received a transfer request for transferring MCIM usage rights from the second wireless communication device 130 to the first wireless communication device 300. In this case, the control unit 210 effects control to transfer the MCIM usage rights from the second wireless communication device 130 to the first wireless communication device 300.

Also, let us assume a case of having received a transfer request for transferring MCIM usage rights from the first wireless communication device 300 to the second wireless communication device 130, from the first wireless communication device 300 in this case, the control unit 210 effects control to transfer the MCIM usage rights from the first wireless communication device 300 to the second wireless communication device 130. On the other hand, in the event of having received that transfer request from any other wireless communication device than the first wireless communication device 300, the MCIM usage rights are not transferred from the first wireless communication device 300 to the second wireless communication device 130.

Display Example of Transfer Result Notification Screen

Figure 9A:
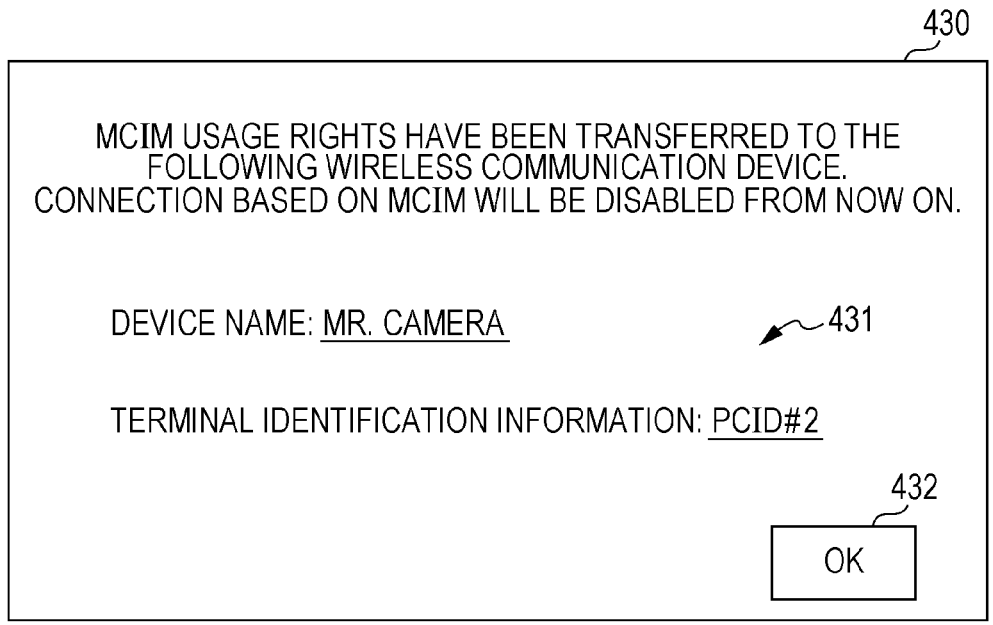
FIGS. 9A and 9B are diagrams illustrating display screen examples (transfer result notification screens) displayed on the display unit of a wireless communication device according to the first embodiment.
Figure 9B:
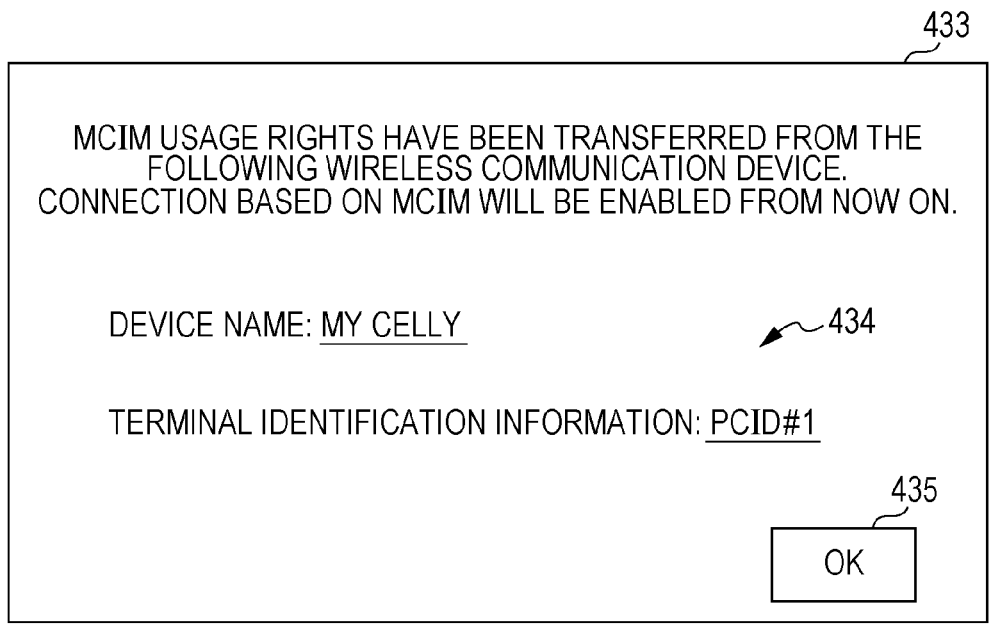

FIGS. 9A and 9B are diagrams illustrating display screen examples (display result notification screens 430 and 433) displayed on the display unit 370 of the wireless communication device according to the first embodiment. The display result notification screens 430 and 433 are screen displayed at the transfer destination and transfer source wireless communication devices after transfer processing of MCIM usage rights has been performed.

FIG. 9A illustrates the display result notification screen 430 displayed on the transfer source wireless communication device (e.g., first wireless communication device 300) after transfer processing of the MCIM usage rights. The display result notification screen 430 is displayed to the effect that transfer processing of the MCIM usage rights has been performed, and a transfer destination device display region 431 and OK button 432 are displayed.

Displayed in the transfer destination device display region 431 is information relating to the transfer destination wireless communication device to which the MCIM usage rights have been transferred. Information relating to the transfer destination wireless communication device that is displayed is, for example, the device name and terminal identification information.

The OK button 432 is a button pressed after confirming the contents of the display result notification screen 430, to transition to another display screen (e.g., startup screen).

FIG. 9B illustrates a the display result notification screen 433 displayed on the transfer destination wireless communication device (e.g., second wireless communication device 130) The display result notification screen 433 is displayed to the effect that transfer processing of the MCIM usage rights has been performed, and a transfer source device display region 434 and OK button 435 are displayed.

Displayed in the transfer source device display region 434 is information relating to the transfer destination wireless communication device from which the MCIM usage rights have been transferred. Information relating to the transfer source wireless communication device that is displayed is, for example, the device name and terminal identification information.

The OK button 435 is a button pressed after confirming the contents of the display result notification screen 433, to transition to another display screen (e.g., startup screen).

Display Example of Transfer Impermissible Notification Screen

FIG. 10 is a diagram illustrating a display screen example displayed on the display unit 370 of the wireless communication device according to the first embodiment (transfer impermissible notification screen 436).

The transfer impermissible notification screen 436 is a display screen displayed at wireless communication device which has performed a MCIM usage rights transfer instruction operation, following which determination has been made the transfer relating to that transfer instruction operation will not be performed. That is to say, the transfer impermissible notification screen 436 is displayed in the event that the determination standards example shown in FIG. 8 yields "impermissible".

The transfer impermissible notification screen 436 makes display to the effect that the MCIM usage rights transfer processing will not be performed, and an OK button 437 is displayed. The OK button 437 a button pressed after confirming the contents of the transfer impermissible notification screen 436, to transition to another display screen (e.g., startup screen).

Figure 11:
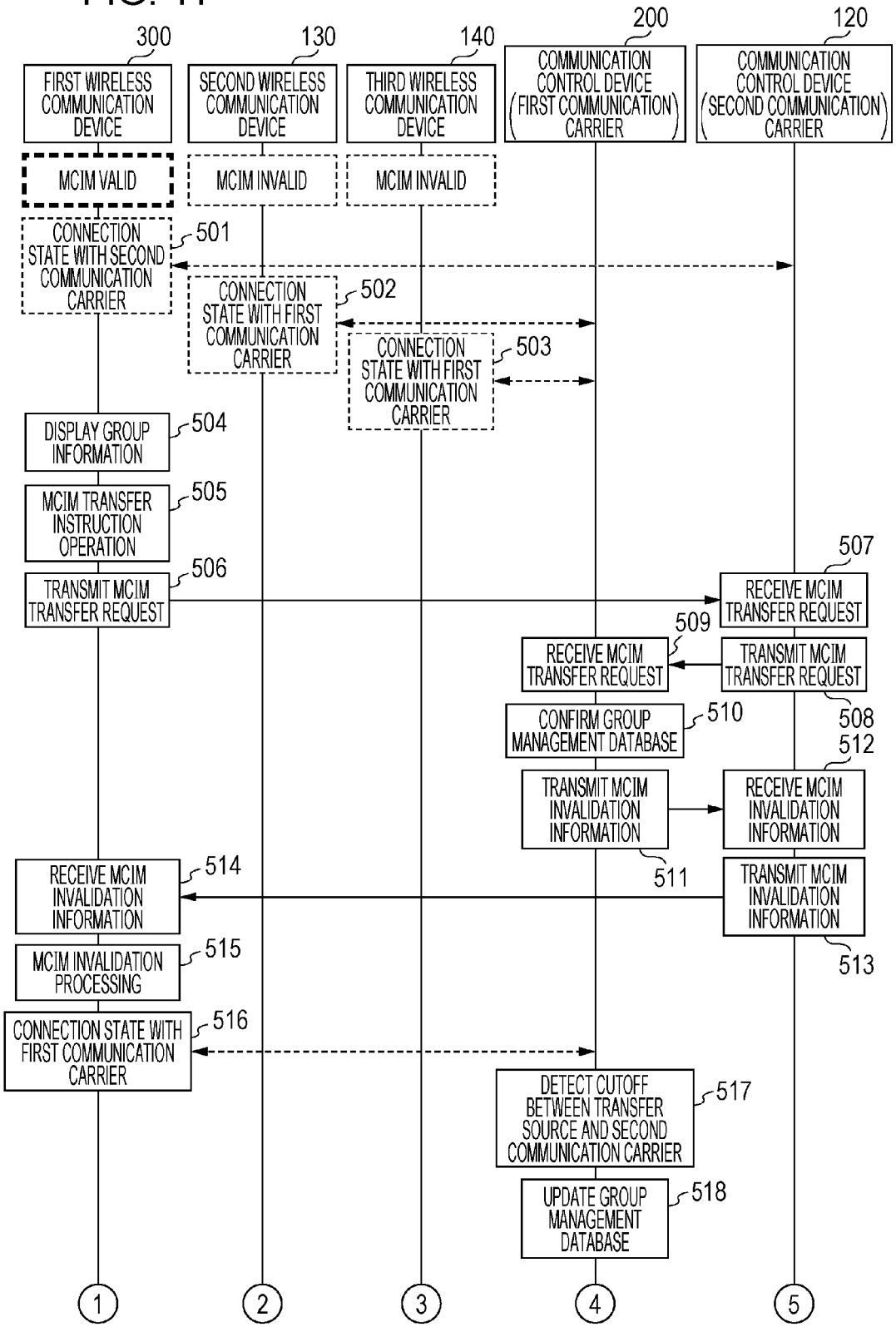
FIG. 11 is a sequence chart illustrating a communication processing example between devices making up the communication system according to the first embodiment.
Figure 12:
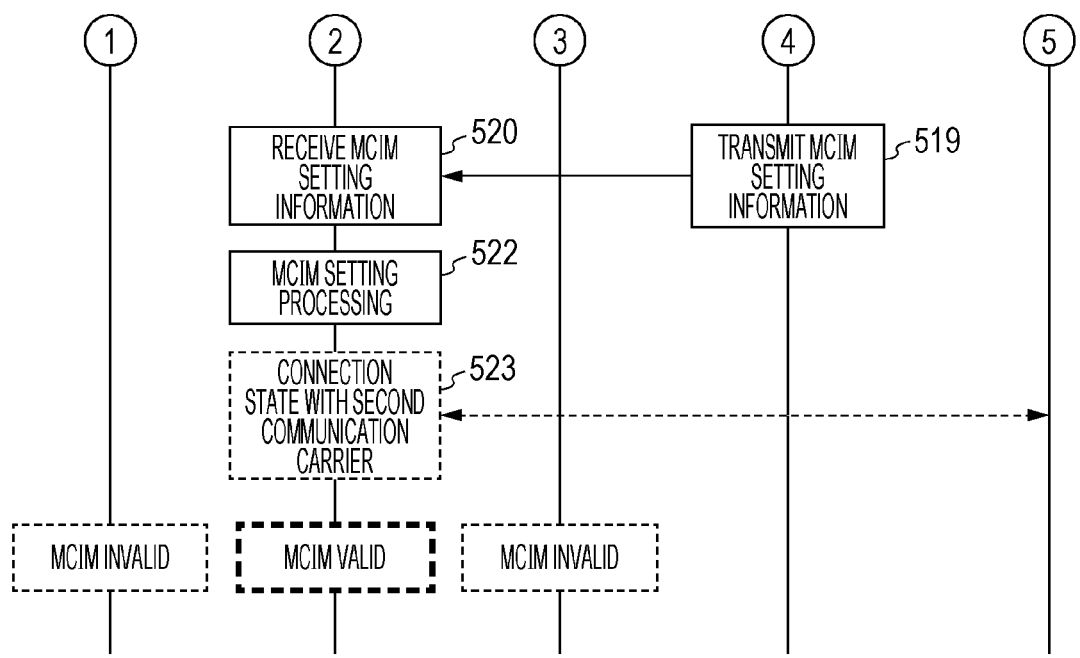
FIG. 12 is a sequence chart illustrating a communication processing example between devices making up the communication system according to the first embodiment.

Communication Example in Case of Performing MCIM Usage Rights Transfer Processing FIGS. 11 and 12 are a sequence chart illustrating a communication processing example between the devices making up the communication system 100 according to the first embodiment. Description will be made with FIGS. 11 and 12 assuming a case where the first wireless communication device 300 in the group AB holds the MCIM usage rights. We will say that the priority order set for the wireless communication devices making up the group AB are as shown in FIG. 4.

FIGS. 11 and 12 illustrate communication processing for a case of transferring MCIM usage rights from the first wireless communication device 300 to the second wireless communication device 130 by operating the first wireless communication device 300. That is to say, FIGS. 11 and 12 illustrate an example of performing transfer instruction operations to transfer MCIM usage rights from a wireless communication device with a higher order priority order to a wireless communication device with a lower order priority order.

Now, in FIGS. 11 and 12, we will say that the first wireless communication device 300 is in a connected state with the communication control device (second communication carrier) 120 (501). Also, we will say that the second wireless communication device 130 and third wireless communication device 140 are in connected states with the communication control device (first communication carrier) 200 (502, 503). Note that the fourth wireless communication device 150 and so forth will be omitted from illustration.

First, a display screen for performing an operation for transferring the MCIM usage rights (MCIM transfer instruction operation) is displayed on the display unit 370 of the first wireless communication device 300 (504). For example, the transfer destination setting screen 410 shown in FIG. 70 is displayed on the display unit 370 of the first wireless communication device 300.

Now, the control unit 330 of the first wireless communication device 300 periodically or otherwise receives group information from the group management database 220 of the communication control device (first communication carrier) 200 via the communication control device (second communication carrier) 120, for example. The control unit 330 can then store the obtained group information in the memory 340. The control unit 330 can thus display the transfer destination setting screen 410 shown in FIG. 7 on the transfer destination setting screen 410, based on the group information stored in the memory 340. Also, an arrangement may be made wherein group information is obtained from the communication control device (first communication carrier) 200 via the communication system 100 by the control unit 330 each time a user operation for displaying the transfer destination setting screen 410 is received. In this case, the control unit 330 can display the transfer destination setting screen 410 on the display unit 370 based on this obtained group information.

Thus, in the event that the transfer destination setting screen 410 shown in FIG. 7 is displayed on the display unit 370 (504), a black dot is shown in the radio button of the transfer destination in the radio button display region 413 to which to transfer the MCIM usage rights (505).

For example, in the event of the second wireless communication device 130 being the transfer destination, a block dot is shown in the radio button thereof in the radio button display region 413, as shown in FIG. 7. After the bock dot is shown in the radio button of the transfer destination in the radio button display region 413, the OK button 414 is pressed (505). In the event that the MCIM transfer instruction operation has been accepted in this way at the first wireless communication device 300 (505), an MCIM transfer request is transmitted from the first wireless communication device 300 to the communication control device (first communication carrier) 200 (506 through 509). In this case, the first wireless communication device 300 is in a connected state with the communication control device (second communication carrier) 120 (501). Accordingly, the MCIM transfer request is transmitted from the first wireless communication device 300 to the communication control device (first communication carrier) 200 via the communication control device (second communication carrier) 120 (506 through 509).

Now, a MCIM transfer request includes the terminal identification information (PCID#1) of the wireless communication device which has performed the operation, and the terminal identification information of the transfer source and transfer destination wireless communication devices (PCID#1, PCID#2). The terminal identification information stored in the memory 340 (e.g., the terminal identification information 225 shown in FIG. 4) may be used as the terminal identification information (PCID#1) of the operating terminal and transfer source (first wireless communication device 300), for example. Also, the terminal identification information included in the group information (e.g., the terminal identification information 225 shown in FIG. 4) may be used as the terminal identification information (PCID#2) of the second wireless communication device 130, for example. Note that an arrangement may be made where the ID and password of the group AB are included in the MCIM transfer request, so as to be used for authentication processing at the communication control device (first communication carrier) 200.

Upon receiving the MCIM transfer request (509), the control unit 210 of the communication control device (first communication carrier) 200 confirms whether or not to perform the transfer processing according to the received MCIM transfer request, using the group management database 220 (510).

Specifically, based on the terminal identification information of the transfer source included in the received MCIM transfer request, the control unit 210 of the communication control device (first communication carrier) 200 extracts the group to which the wireless communication device which has transmitted the MCIM transfer request belongs to. That is to say, the wireless communication device matching the terminal identification information of the transfer source included in the received MCIM transfer request is extracted from the group management database 220, and the group relating to the extracted terminal identification information is extracted. For example, "Group AB" (shown in FIG. 4) is extracted as the group to which the first wireless communication device 300 belongs.

The control unit 210 of the communication control device (first communication carrier) 200 then determines whether or not the wireless communication devices which are the transfer source and transfer destination included in the received MCIM transfer request belong to the same group. In the event that the wireless communication devices which are the transfer source and transfer destination included in the received MCIM transfer request do not belong to the same group, notification is made to the operating terminal (first wireless communication device 300) that MCIM usage rights transfer processing is not performable.

Also, in the event that the wireless communication devices which are the transfer source and transfer destination included in the received MCIM transfer request belong to the same group, the priority orders of the wireless communication devices which are the transfer source and transfer destination are confirmed. For example, in the event that the priority order of the transfer source is lower order and the priority order of the transfer destination is higher order, the determination standards example in FIG. 8 shows this to be "permissible", and accordingly transfer processing relating to the received MCIM transfer request is performed.

Also, in the event that the priority order of the transfer source is higher order and the priority order of the transfer destination is lower order, the determination standards example in FIG. 8 shows this to be "permissible" only in the event that the transfer instruction operation has been made at the transfer source (higher order priority order). Accordingly, transfer processing relating to the received MCIM transfer request is performed. However, in the event that the priority order of the transfer source is higher order and the priority order of the transfer destination is lower order, the determination standards example in FIG. 8 shows this to be "impermissible" in the event that the transfer instruction operation has not been made at the transfer source (higher order priority order). Accordingly, transfer processing relating to the received MCIM transfer request is not performed.

Thus, the control unit 210 of the communication control device (first communication carrier) 200 determines whether or not to perform transfer processing relating to the received MCIM transfer request, based on the priority order of the transfer source and transfer destination (510). In the event that determination is made to perform the transfer processing relating to the received MCIM transfer request, the control unit 210 of the communication control device (first communication carrier) 200 transmits MCIM invalidation information to the first wireless communication device 300 (511 through 514). This MCIM invalidation information is information for invalidating the MCIM usage rights held in the transfer source wireless communication device.

Upon the first wireless communication device 300 receiving the MCIM invalidation information (514), the control unit 330 of the first wireless communication device 300 performs invalidation processing of the MCIM stored in the MCIM information storage unit 350 (515). Accordingly, the MCIM stored in the first wireless communication device 300 is invalidated, and the first wireless communication device 300 is no longer able to perform connection with the communication control device (second communication carrier) 120 based on the MCIM. Accordingly, the first wireless communication device 300 is in a connected state connected with the communication control device (first communication carrier) 200 by limited connection based on PCID (516).

Upon MCIM invalidation processing at the transfer source being thus performed (515) and connection between the transfer source and the communication control device (second communication carrier) 120 being cut off, the control unit 210 of the communication control device (first communication carrier) 200 detects this cutoff (517). For example, the control unit 210 can detect the cutoff by notification being transmitted from the transfer source (first wireless communication device 300) to the communication control device (first communication carrier) 200 after the MCIM invalidation processing has been performed (517). Also, an arrangement may be made where the control unit 210 detects the connection state between the transfer source (first wireless communication device 300) and communication control device (first communication carrier) 200 by limited connection, thereby detecting the cutoff (517).

Thus, upon the control unit 210 detecting cutoff of the transfer source and communication control device (second communication carrier) 120 (517), the control unit 210 updates the contents of the group management database 220 (518). For example, in the valid/invalid information 226 shown in FIG. 4, the first wireless communication device 300 (terminal identification information 225 "PCID#1") is changed from "valid" to "invalid". On the other hand, the second wireless communication device 130 (terminal identification information 225 "PCID#2") is changed from "invalid" to "valid".

Also, upon the control unit 210 of the communication control device (first communication carrier) 200 detecting the cutoff of the transfer source and the communication control device (second communication carrier) 120 (517), the control unit 210 transmits MCIM setting information to the second wireless communication device 130 (519, 520). This MCIM setting information is information for setting the MCIM usage rights to the wireless communication device (validation information). Now, the second wireless communication device 130 is connected to the communication control device (first communication carrier) 200 (502), so the MCIM setting information is directly transmitted from the communication control device (first communication carrier) 200 to the second wireless communication device 130 (519, 520).

Upon the second wireless communication device 130 receiving the MCIM setting information (520), the control unit 330 of the first wireless communication device 300 performs setting processing (validation processing) of the MCIM stored in the MCIM information storage unit 350 (522). Accordingly, the MCIM usage rights is set to the second wireless communication device 130 so the second wireless communication device 130 and perform connection with the communication control device (second communication carrier) 120 based on the MCIM. Accordingly, the second wireless communication device 130 is in a connection state connected with the communication control device (second communication carrier) 120 by connection based on the MCIM (523).

Thus, in the event that an MCIM transfer instruction operation is performed at a wireless communication device at a higher order priority order, transfer processing is performed without performing authorization or the like regarding transfer of the MCIM usage rights.

Note that in this example, a case of transferring the MCIM usage rights by validation/invalidation of the MCIM has been illustrated, but MCIM usage rights may be transferred by transferring the MCIM itself. In this case, upon the MCIM invalidation information being transmitted to the first wireless communication device 300, the MCIM held at the first wireless communication device 300 is invalidated (erased). On the other hand, upon MCIM setting information (including information for writing the MCIM) being transmitted to the second wireless communication device 130, a valid MCIM is stored in the MCIM information storage unit 350 of the second wireless communication device 130 based on that setting information. Accordingly, the MCIM usage rights are set to the second wireless communication device 130.

Also, while an example of performing transfer instruction operations relating to transfer of MCIM usage rights from higher order to lower order in priority order using a wireless communication device with higher order priority order has been illustrated with FIGS. 11 and 12, a case where the transfer instruction operation is performed at another wireless communication device can be assumed. This example is illustrated in FIG. 13.

Figure 13:
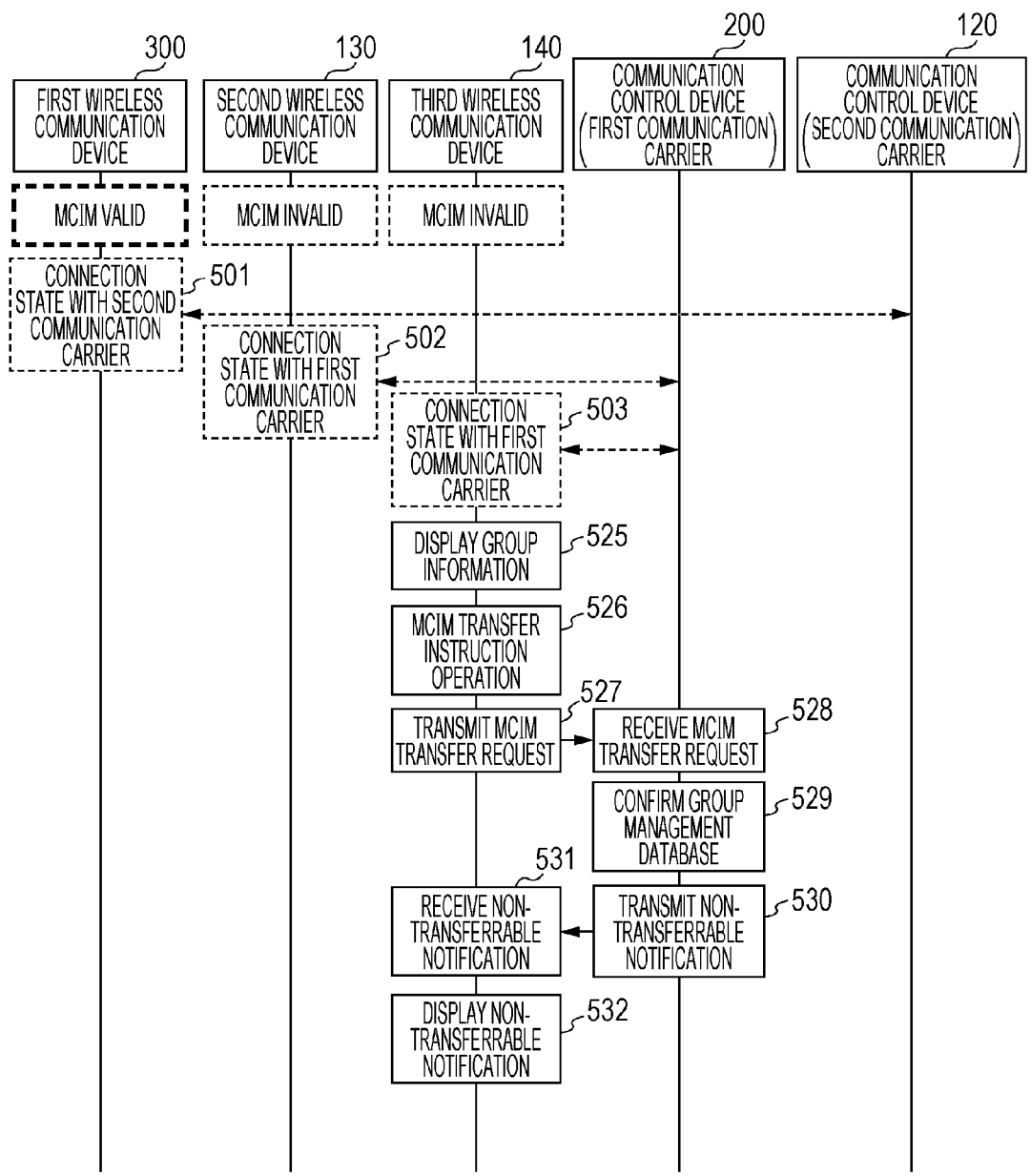
FIG. 13 is a sequence chart illustrating a communication processing example between devices making up the communication system according to the first embodiment.

Communication Example in Case of Performing MCIM Usage Rights Transfer Processing FIG. 13 is a sequence chart illustrating a communication processing example between the devices making up the communication system 100 with the first embodiment. Specifically, FIG. 13 is a sequence chart illustrating a communication example in the event that the priority order of the transfer source is higher order, the priority order of the transfer destination is lower, and a wireless communication device other than the transfer source performs the MCIM usage rights transfer processing.

The sequence chart in FIG. 13 is a modification of that in FIGS. 11 and 12, so a part of the description regarding the portions that are common with FIGS. 11 and 12 will be omitted. Also, with FIG. 13, an example of performing a transfer request using the third wireless communication device 140 which does not hold the MCIM usage rights will be described.

The processing (525 through 528) in FIG. 13 corresponds to the processing (504 through 509) shown in FIG. 11. Note however, that as described above, the third wireless communication device 140 is in a connected state with the communication control device (first communication carrier) 200 (503). Accordingly, this differs from the example in FIG. 11 in that the exchange between the third wireless communication device 140 and the communication control device (first communication carrier) 200 is effected directly between the communication control device (first communication carrier) 200 and the third wireless communication device 140.

Upon receiving the MCIM transfer request (528), the control unit 210 of the communication control device (first communication carrier) 200 confirms whether or not to perform the transfer processing relating to the received MCIM transfer request using the group management database 220 (529).

Now, in the example illustrated in FIG. 13, the priority order of the transfer source is higher order and the priority order of the transfer destination is lower order, and since the transfer instruction operation is not an operation made from the transfer source (with higher order priority order), the determination standards example in FIG. 8 shows this to be "impermissible". Accordingly, the control unit 210 of the communication control device (first communication carrier) 200 determines not to perform the transfer processing relating to the received MCIM transfer request (529).

Next, the control unit 210 of the communication control device (first communication carrier) 200 transmits a transfer impermissible notification to the wireless communication device which has performed the MCIM transfer request (the third wireless communication device 140) to the effect that transfer processing of the MCIM usage rights is not available (529, 531). This transfer impermissible notification is information to display the transfer impermissible notification screen 436 shown in FIG. 10, for example, on the display unit 370 of the third wireless communication device 140.

Upon receiving the transfer impermissible notification (531), the third wireless communication device 140 displays the transfer impermissible notification on the display unit 370 (532). For example, the transfer impermissible notification 436 shown in FIG. 10 is displayed on the display unit 370 of the third wireless communication device 140.

While an example of an MCIM transfer instruction operation being performed using the third wireless communication device 140 has been illustrated in FIG. 13, this can be similarly applied to a case of an MCIM transfer instruction operation being performed using the second wireless communication device 130 or another wireless communication device (including a wireless communication device not belonging to the group AB).

Figure 14:
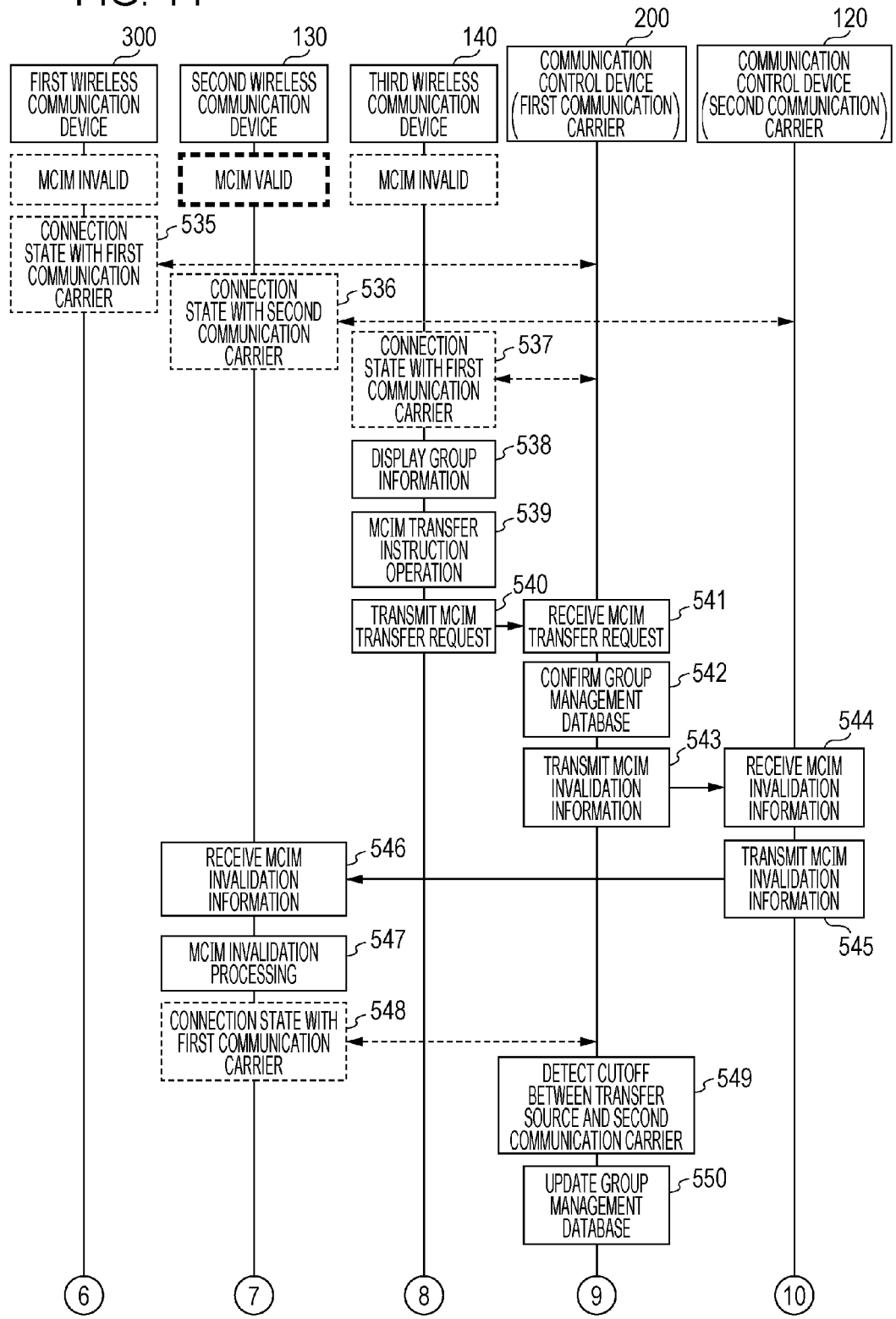
FIG. 14 is a sequence chart illustrating a communication processing example between devices making up the communication system according to the first embodiment.
Figure 15:
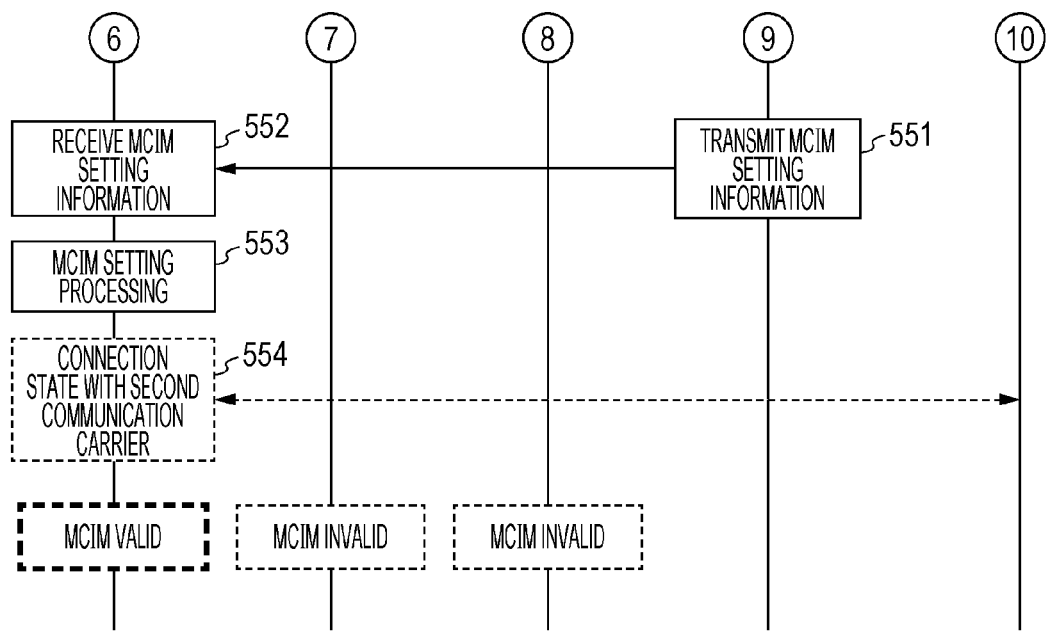
FIG. 15 is a sequence chart illustrating a communication processing example between devices making up the communication system according to the first embodiment.

Communication Example in Case of Performing MCIM Usage Rights Transfer Processing FIGS. 14 and 15 are a sequence chart illustrating a communication processing example between the devices making up the communication system 100 according to the first embodiment. Specifically, FIGS. 14 and 15 illustrate a communication example in a case where the priority order of the transfer source is a lower order and the priority order of the transfer destination is higher order, with transfer processing of MCIM usage rights being performed using a wireless communication device other than one which is the object of the transfer.

The sequence chart illustrated in FIGS. 14 and 15 is a modification of the arrangement in FIGS. 11 and 12, so part of the description will be omitted regarding portions held in common with FIGS. 11 and 12. Also, description will be made with FIGS. 14 and 15 regarding an example of performing a transfer request using the third wireless communication device 140 which does not have MCIM usage rights and which is not an object of transfer (i.e., neither transfer source nor transfer destination).

Now, in FIGS. 14 and 15, we will say that the second wireless communication device 130 holds the MCIM usage rights, and the second wireless communication device 130 is in a connected state with the communication control device (second communication carrier) 120 (536). Also, we will say that the first wireless communication device 300 and third wireless communication device 140 are in connected states with the communication control device (first communication carrier) 200 (535, 537). Note that the fourth wireless communication device 150 and so forth will be omitted from illustration.

The processing (538 through 541) shown in FIG. 14 corresponds to the processing (504 through 509) shown in FIG. 11. However, as described above, the third wireless communication device 140 is in a connected state with the communication control device (first communication carrier) 200 (537). Accordingly, this differs with regard to the point that exchange of information between the third wireless communication device 140 and communication control device (first communication carrier) 200 is directly performed between the third wireless communication device 140 and communication control device (first communication carrier) 200.

Upon receiving an MCIM transfer request (541), the control unit 210 of the communication control device (first communication carrier) 200 confirms whether or not to perform the transfer processing according to the received MCIM transfer request, using the group management database 220 (542).

With the example shown in FIGS. 14 and 15, the priority order of the transfer source is lower order and the priority order of the transfer destination is higher order, so the determination standards example in FIG. 8 shows this to be "permissible". Accordingly, the control unit 210 of the communication control device (first communication carrier) 200 determines that the transfer processing according to the received MCIM transfer request will be performed (542).

The processing (543 through 554) in FIGS. 14 and 15 corresponds to the processing (511 through 523) in FIGS. 511 through 523. However, this differs with regard to the point that the transfer source and transfer destination of the MCIM usage rights are reversed.

Operating Example of Communication System

Next, the operations of the communication system 100 according to the first embodiment will be described with reference to the drawings.

Operating Example of Communication Control Device (First Communication Carrier)

Figure 16:
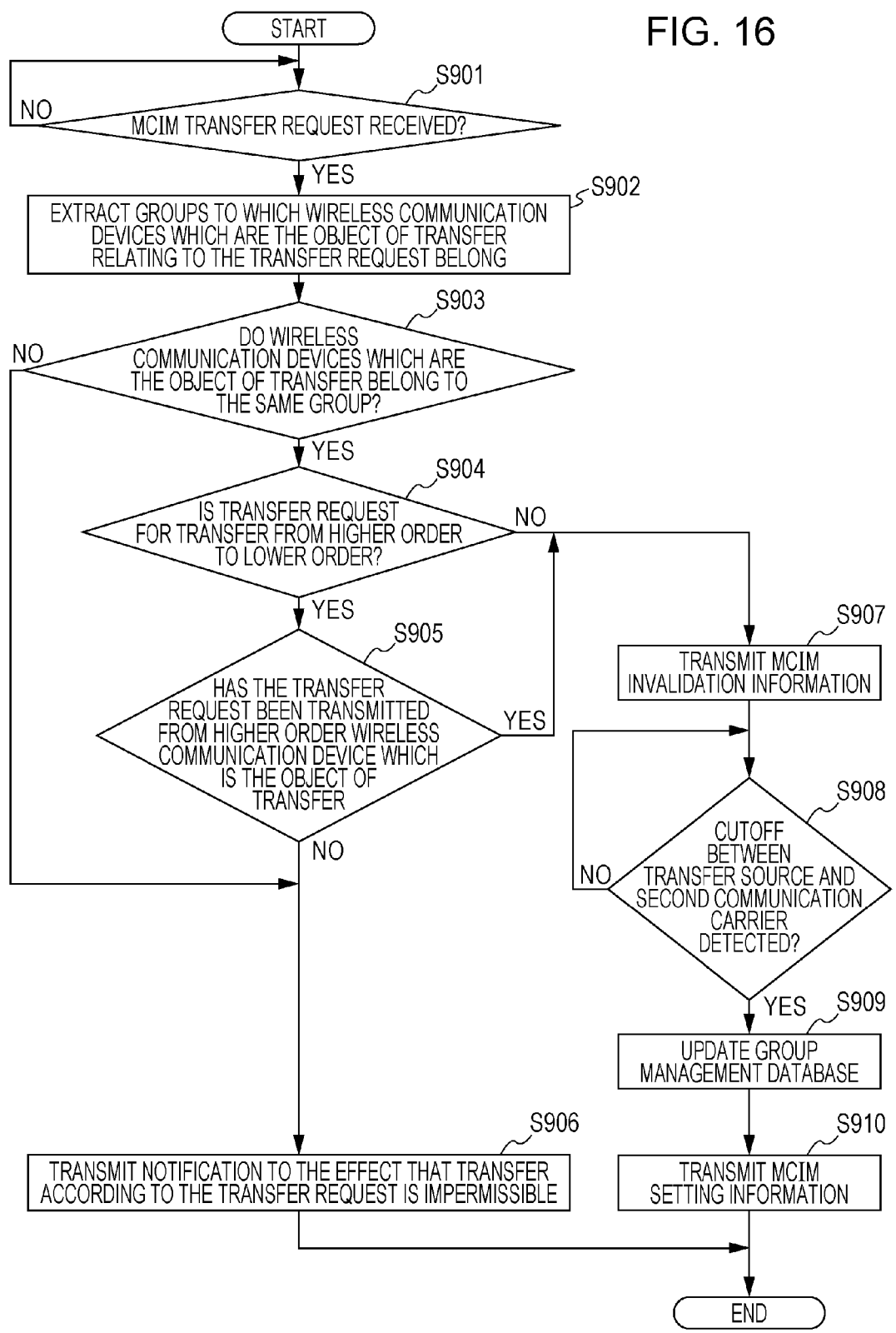
FIG. 16 is a flowchart illustrating an example of processing procedures of communication processing by a communication control device (first communication carrier) according to the first embodiment.

FIG. 16 is a flowchart illustrating an example of processing procedures of communication processing by the communication control device (first communication carrier) 200 according to the first embodiment.

The control unit 210 determines whether or not an MCIM transfer request has been received (step S901), and in the event that no MCIM transfer request has been received, monitoring is continued. In the event that an MCIM transfer request has been received (step S901), the control unit 210 extracts the group(s) to which the wireless communication devices relating to the received MCIM transfer request belong, from the group management database 220 (step S902). Note that step S901 is an example of accepting, according to an embodiment of the disclosure.

Next, the control unit 210 determines whether or not the two wireless communication devices (transfer source and transfer destination) which are the object of transfer relating to the received MCIM transfer request belong to the same group (step S903). In the event that the two wireless communication devices which are the object of transfer do not belong to the same group (step S903), the control unit 210 transmits a transfer impermissible notification to the wireless communication device which has transmitted that MCIM transfer request (step S906). This transfer impermissible notification is a notification to the effect that the transfer according to the received MCIM transfer request is impermissible.

Also, in the event that the two wireless communication devices which are the object of transfer belong to the same group (step S903), the control unit 210 determines whether or not the received MCIM transfer request is a transfer request from a higher order priority order to a lower order priority order (step S904). In the event that the transfer request is not a transfer request from a higher order priority order to a lower order priority order (i.e., in the event that the transfer request is a transfer request from a lower order priority order to a higher order priority order) (step S904), the flow advances to step S907. On the other hand in the event that the transfer request is a transfer request from a higher order priority order to a lower order priority order (step S904), the control unit 210 determines whether or not the wireless communication device which has transmitted the transfer request satisfies predetermined conditions (step S905). The predetermined conditions are that the wireless communication device which has transmitted the transfer request is a wireless communication device which is an object of transfer according to the transfer request, and is a wireless communication device of higher order priority order.

In the event that the wireless communication device which has transmitted that transfer request is not a wireless communication device which is an object of transfer according to the transfer request, or the transfer request has been made from a wireless communication device of lower order priority order (step S905), the flow advances to step S906.

In the event that the transfer request is a wireless communication device which is an object of transfer according to the transfer request, and is a wireless communication device of higher order priority order (step S905), the control unit 210 transmits MCIM invalidation information to the transfer source (step S907).

Next, the control unit 210 determines whether or not cutoff between the transfer source regarding which MCIM invalidation processing has been performed and the communication control device (second communication carrier) 120 has been detected (step S908), and in the event that the cutoff has not been detected, continues monitoring. In the event that the cutoff has been detected (step S908), the control unit 210 updates the contents of the group management database 220 (step S909). That is to say, the contents of the group management database 220 are changed such that the content thereof reflects the situation after the MCIM usage rights transfer processing.

Next, the control unit 210 transmits the MCIM setting information to the transfer destination (step S910). Note that steps S902 through S910 are an example of control according to an embodiment of the disclosure.

Thus, according to the first embodiment, priority order is set for the wireless communication devices making up a group sharing MCIM usage rights. By priority order being set for the wireless communication devices, communication resources can be appropriately assigned. That is to say, the MCIM usage rights can be appropriately transferred. For example, in the event that predetermined conditions (transfer instruction operations by a wireless communication device with high priority order) are not satisfied, transfer of the MCIM usage rights to a wireless communication device with low priority order is forbidden.

Also, erroneous operations by the user (e.g., MCIM transfer instruction operations) and unintended appropriation by simultaneous use by multiple users (i.e., unintended transfer of MCIM usage rights) can be prevented.

Also, a wireless communication device with low priority order can be prevented from hoarding the MCIM usage rights, and MCIM usage rights can be easily obtained when a wireless communication device with high priority order finds it necessary. That is to say, the MCIM usage rights can be appropriately shared between multiple wireless communication devices.

2. Second Embodiment

With the first embodiment, description has been made regarding an example where, in the event that a transfer request is made from higher order to lower order priority order, the transfer processing according to that transfer request is performed only in the event that the wireless communication device which has made that transfer request satisfies predetermined conditions. That is to say, an example has been illustrated of determining whether or not to perform the transfer processing based on priority order alone, other than a transfer request from a wireless communication device of which the priority order is higher order. However, an arrangement may be made where, with regard to transfer requests other than from a wireless communication device with higher order priority order, the transfer processing is performed under the condition that there has been authorization from a higher order wireless communication device, for example.

Accordingly, with the second embodiment of the present technology, an example will be illustrating regarding other than a transfer request from a wireless communication device with higher order priority order. Note that the configuration of the communication system according to the second embodiment is generally the same as with the example shown in FIG. 3 and so forth, and accordingly, description will be partially omitted regarding portions which are in common with the first embodiment.

Example of Determination Standards Relating to Transfer of MCIM Usage Rights

FIG. 17 is a diagram illustrating an example of determination standards relating to transfer of the MCIM usage rights between the wireless communication devices according to the second embodiment. Note that the determination standards shown in FIG. 17 are a partial modification of FIG. 8, so portions which are equivalent to those in FIG. 8 are denoted with the same reference numerals, and description thereof will be omitted.

Specifically, the determination standards shown in FIG. 17 are such that even in a situation where the determination standards shown in FIG. 8 yield "impermissible", the transfer is performed under the condition that authorization processing is performed by a higher order wireless communication device.

That is to say, restriction on transfer of MCIM usage rights is loosened in a case that a transfer instruction operation for MCIM usage rights from a higher order wireless communication device to a lower order wireless communication device is made, under the condition that authorization has been made by a higher order wireless communication device.

Now, let us assume a case here, wherein as shown in FIG. 4, the priority order set to the second wireless communication device 130 is lower than the priority order set to the first wireless communication device 300. We will further assume that a transfer request for transferring the MCIM usage rights from the first wireless communication device 300 to the second wireless communication device 130 has been accepted from a wireless communication device other than the first wireless communication device 300, for example. In this case, the control unit 210 effects control to transfer the MCIM usage rights from the first wireless communication device 300 to the second wireless communication device 130 only in the event that predetermined conditions are satisfied. For example, the control unit 210 determines that the predetermined conditions have been satisfied in the event that authorization processing of the transfer relating to that transfer request has been performed at the first wireless communication device 300.

Example of Transfer Authorization Display Screen

Figure 18:
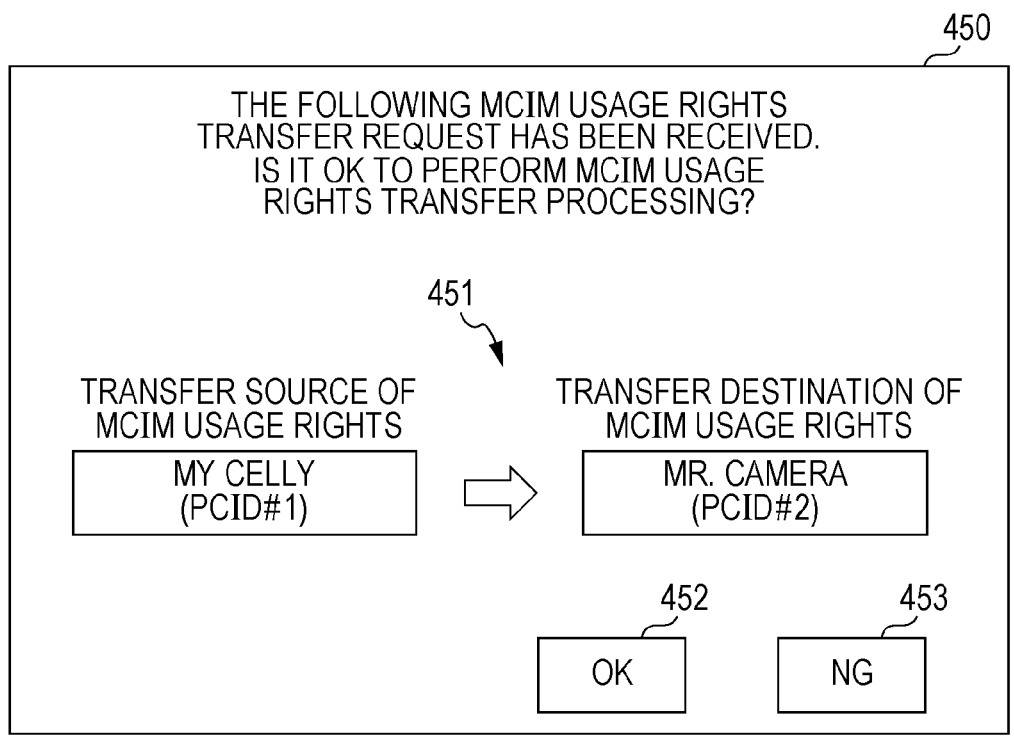
FIG. 18 is a diagram illustrating a display screen example (transfer authorization screen) displayed on the display unit of a wireless communication device according to the second embodiment.

FIG. 18 is a diagram illustrating a display screen example (transfer authorization screen 450) displayed on the display unit 370 according to the second embodiment.

The transfer authorization screen 450 is a display screen for displaying information relating to a transfer source or transfer destination wireless communication device of MCIM usage rights, so that the user can authorize the transfer of the MCIM usage rights. The transfer authorization screen 450 is provided with a transfer object device display list 451, an OK button, and a cancel button 453.

The transfer object device display list 451 displays information relating to the transfer source and transfer destination wireless communication device of MCIM usage rights. Information displayed relating to the transfer source and transfer destination wireless communication device is, for example, the device name and terminal identification information.

With this example, an example is illustrated where the device name and terminal identification information are simultaneously displayed as information relating to the transfer source and transfer destination wireless communication device, and the wireless communication devices are notified to the user. Note that information included in the transfer authorization request (e.g., shown in FIG. 19) transmitted from the control unit 210 of the communication control device (first communication carrier) 200 may be displayed on the transfer authorization screen 450 as an image where a wireless communication device has is depicted as a shape (device icon). Also, for example, other information relating to the wireless communication device of the other party (e.g., device icon) may be displayed along with the device name and terminal identification information, based on the registration information held at the second wireless communication device 130. Also, information relating top the wireless communication device which has transmitted the MCIM transfer request may be displayed, besides information relating to the transfer source or transfer destination wireless communication device.

The OK button 452 is a button pressed in the event of the user authorizing the transfer processing of the MCIM usage rights between the wireless communication devices displayed in the transfer object device display list 451. The cancel button 453 is a button pressed in the event of the user not authorizing the transfer processing of the MCIM usage rights between the wireless communication devices displayed in the transfer object device display list 451.

Note that this example illustrates a case of determination being made that the user has authorized performing of the transfer processing of the MCIM usage rights in the event that the OK button 452 has been pressed on the transfer authorization screen 450. Alternatively, an arrangement may be made wherein, for example, determination is made that the user has authorized performing of the transfer processing of the MCIM usage rights in the event that a predetermined password (e.g., group password) has been input, besides the OK button 452 having been pressed.

Figure 19:
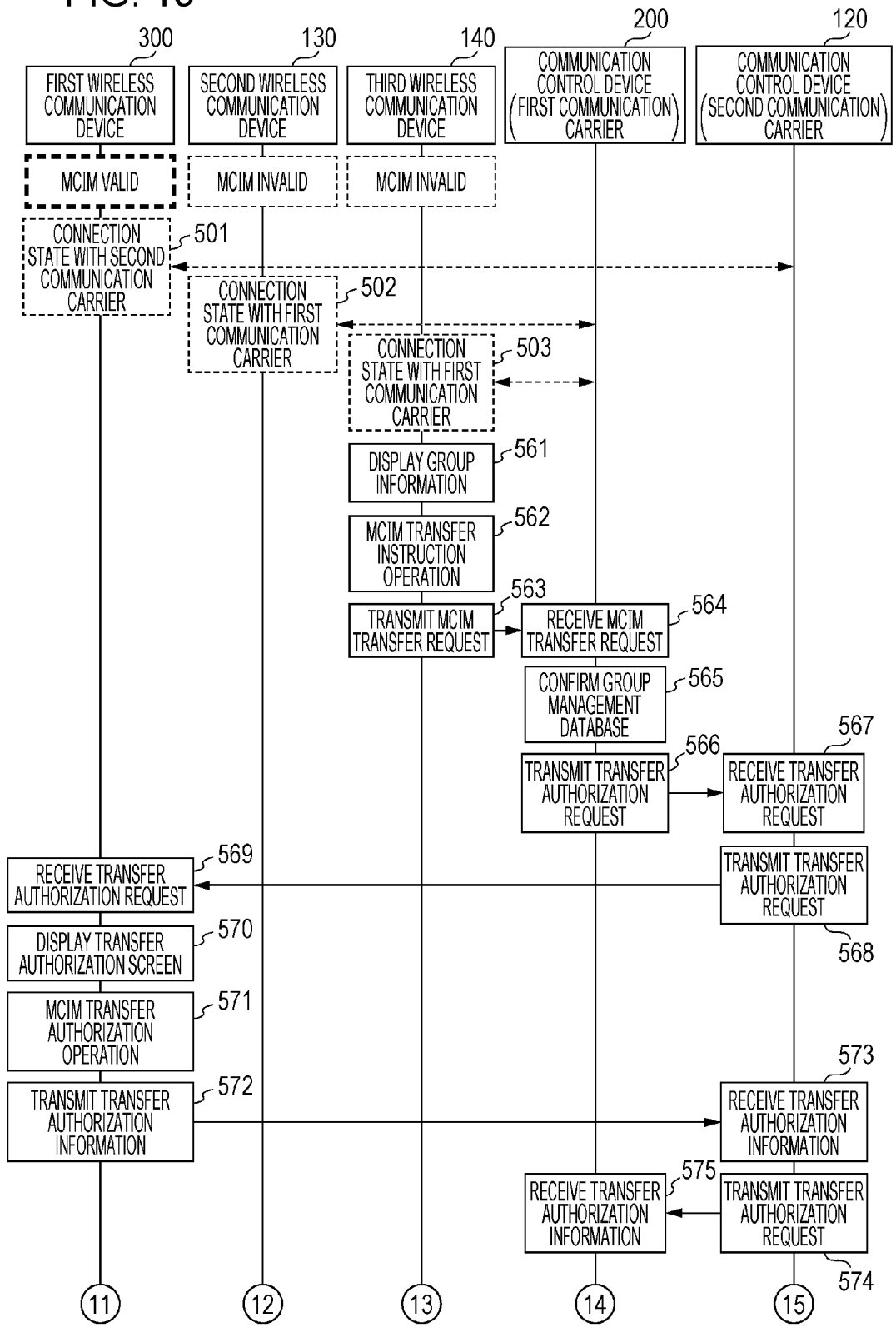
FIG. 19 is a sequence chart illustrating a communication processing example between devices making up the communication system according to a second embodiment.
Figure 20:
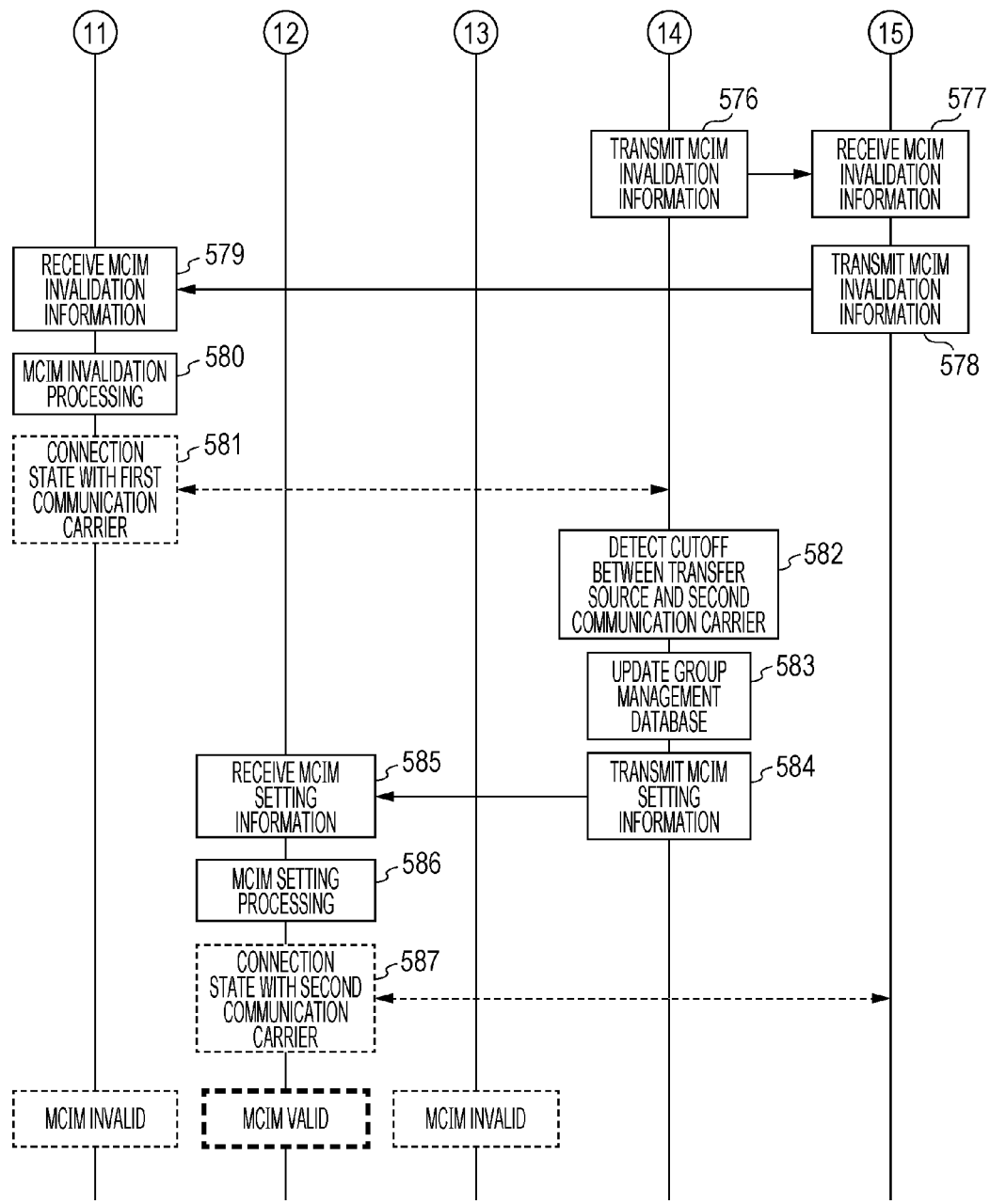
FIG. 20 is a sequence chart illustrating a communication processing example between devices making up the communication system according to the second embodiment.

Communication Example in Case of Performing MCIM Usage Rights Transfer Processing FIGS. 19 and 20 are a sequence chart illustrating a communication processing example between the devices making up the communication system 100 according to the second embodiment. Specifically, FIGS. 19 and 20 illustrate a communication example in a case where the priority order of the transfer source is a higher order and the priority order of the transfer destination is a lower order, with transfer processing of MCIM usage rights being performed using a wireless communication device other than one which is the object of the transfer.

The sequence chart illustrated in FIGS. 19 and 20 is a modification of the arrangement in FIGS. 11 and 12, so part of the description will be omitted regarding portions held in common with FIGS. 11 and 12. Also, description will be made with FIGS. 19 and 20 regarding an example of performing a transfer request using the third wireless communication device 140 which does not have MCIM usage rights and which is not an object of transfer (i.e., neither transfer source nor transfer destination).

The processing shown in FIG. 19 (561 through 564) corresponds to the processing in FIG. 11 (504 through 509). Note however, as described above, the third wireless communication device 140 is in a connected state with the communication control device (first communication carrier) 200 (503). Accordingly, this differs from the example in FIG. 11 in that the exchange between the third wireless communication device 140 and the communication control device (first communication carrier) 200 is effected directly between the communication control device (first communication carrier) 200 and the third wireless communication device 140.

Upon receiving the MCIM transfer request (564), the control unit 210 of the communication control device (first communication carrier) 200 confirms whether or not to perform the transfer processing relating to the received MCIM transfer request using the group management database 220 (565).

Now, in the example illustrated in FIGS. 19 and 20, the priority order of the transfer source is higher order and the priority order of the transfer destination is lower order, and since the transfer instruction operation is not an operation made from the transfer source (with higher order priority order), the determination standards example in FIG. 17 shows this to be "only permissible with authorization of higher order device". Accordingly, the control unit 210 of the communication control device (first communication carrier) 200 determines to perform the transfer processing relating to the received MCIM transfer request under the condition of having received authorization of the transfer source wireless communication device (with higher order priority order) (565). In this case, the control unit 210 of the communication control device (first communication carrier) 200 obtains the information relating to the transfer source and transfer designation (device name, terminal identification information, etc.) to be transmitted to the first wireless communication device 300, from the group management database 220.

Next, the control unit 210 of the communication control device (first communication carrier) 200 transmits the transfer authorization request to the wireless communication device identified by the terminal identification information of the transfer source included in the received MCIM transfer request (566 through 569). This transfer authorization request includes information relating to the transfer source and transfer destination included in the received MCIM transfer request.

Upon the first wireless communication device 300 having received the transfer authorization request (569), the control unit 330 of the first wireless communication device 300 displays a transfer authorization screen for the user to perform authorization regarding the transfer of the MCIM usage rights, on the display unit 370 of the first wireless communication device 300 (570). For example, the transfer authorization screen 450 shown in FIG. 18 is displayed on the display unit 370.

Now, let us say that the OK button 452 has been pressed at the transfer authorization screen 450 shown in FIG. 18 (571). In the event that an MCIM usage rights transfer authorization operation (pressing of the OK button 452) has been performed in this way (571), a transfer authorization notification to the effect that transfer of the MCIM usage rights is authorized, is transmitted to the communication control device (first communication carrier) 200 (572 through 575). Note that in the event that the cancel button 453 has been pressed (571), transfer authorization information to the effect that transfer of the MCIM usage rights is not authorized is transmitted from the first wireless communication device 300 to the communication control device (first communication carrier) 200 (572 through 575). In the event that the cancel button 453 is pressed in this way, the subsequent transfer processing of the MCIM usage rights is not performed. Also, a notification is transmitted to the wireless communication device which has transmitted the MCIM usage rights transfer request (the third wireless communication device 140) to notify to the effect that the request was not authorized.

Note that with FIGS. 19 and 20, an example has been illustrated in which transfer of MCIM usage rights is authorized by pressing the Ok button 452 on the transfer authorization screen 450. Alternatively, an arrangement may be made wherein input operation of a password or the like is prompted after the pressing operation of the OK button 452, and transfer of the MCIM usage rights is authorized under the condition that the input is correct.

Also, with FIGS. 19 and 20, an example has been illustrated in which the user manually performs the operation regarding authorization of transfer of the MCIM usage rights at the first wireless communication device 300 (571). Alternatively, an arrangement may be made wherein, upon having received a transfer authorization request (569), the first wireless communication device 300 automatically transmits transfer authorization information (572). For example, registration is made at the first wireless communication device 300 beforehand to the effect that transfer of the MCIM usage rights between wireless communication devices making up the group AB is to be authorized, such that in the event that the first wireless communication device 300 receives a transfer authorization request, the transfer authorization information is automatically transferred to the communication control device (first communication carrier) 200.

Also, an arrangement may be made wherein, instead of transmitting the transfer authorization request to the first wireless communication device 300, the communication control device (first communication carrier) 200 confirms the content of the group management database 220, and then automatically performs MCIM transfer processing. In the event of performing processing automatically in this way, the user is to have performed settings to the effect beforehand, for example. Accordingly, by performing the authorization processing automatically, authorization which the user intends can be easily performed even in the event that the wireless communication device to be used for authorization operations is at a relatively remote location, for example.

Also, in the event that the communication control device (first communication carrier) 200 has received the transfer authorization information (575), the control unit 210 transmits MCIM invalidation information to the first wireless communication device 300 (576 through 579). The processing (576 through 587) shown in FIG. 20 corresponds to the processing (511 through 523) shown in FIGS. 11 and 12.

While an example has been illustrated with FIGS. 19 and 20 regarding a case of performing MCIM transfer instruction operations using the third wireless communication device 140, this may be the same in a case of performing MCIM transfer instruction operations using the second wireless communication device 130 or another wireless communication device (including a wireless communication device not belonging to the group AB).

Operating Example of Communication Control Device (First Communication Carrier)

Figure 21:
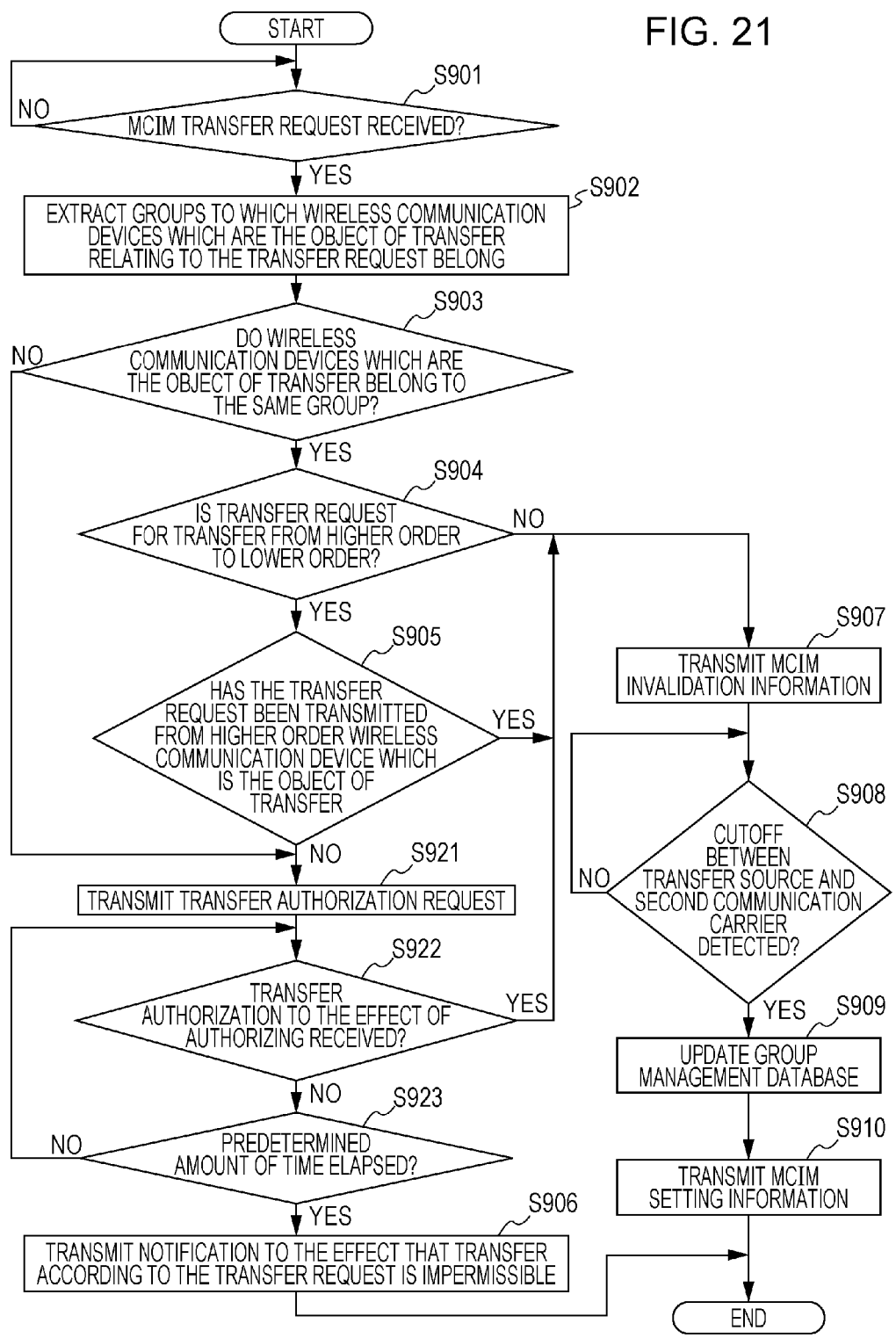
FIG. 21 is a flowchart illustrating an example of processing procedures of communication processing by the communication control device (first communication carrier) according to the second embodiment.

FIG. 21 is a flowchart illustrating an example of processing procedures of communication processing by the communication control device (first communication carrier) 200 according to the second embodiment. Note that FIG. 21 is a modification of FIG. 16, so portions the same as with FIG. 16 will be denoted with the same symbols and description thereof will be partially omitted.

In the event that the two wireless communication devices which are the object of transfer do not belong to the same group (step S903), or in the event that the wireless communication device which has transmitted the transfer request does not satisfy the predetermined conditions (step S905), the control unit 210 transmits a transfer authorization request (step S921). This transfer authorization request is transmitted to the transfer source wireless communication device (with higher order priority order).

Next, the control unit 210 determines whether or not transfer authorization information to the effect of authorizing has been received (step S922), and in the event that transfer authorization information to the effect of authorizing has not been received (step S922), the control unit 210 determines whether or not a predetermined amount of time has elapsed after having transferred the transfer authorization request (step S923), and in the event that the predetermined amount of time has not elapsed, returns to step S922. On the other hand, in the event that the predetermined amount of time has elapsed after having transferred the transfer authorization request (step S923), the flow advances to step S906. Thus, in the event that no response is returned even after a predetermined amount of time has elapsed, the transfer authorization request can be deemed to have been rejected.

In this way, with the second embodiment, transfer processing is performed even for a transfer request from a wireless communication device with higher order priority order, under the condition that authorization has been obtained from a higher order wireless communication device. That is to say, in the event of transferring MCIM usage rights, necessitating authorization from a wireless communication device with high priority order allows transfer of an MCIM being used at a wireless communication device to be prevented, for example.

3. Third Embodiment

With the first and second embodiments, description has been made regarding an example where, in the event that a transfer request is made from higher order to lower order priority order, the transfer processing according to that transfer request is performed. However, there can be assumed a case where MCIM usage rights are set to a wireless communication device with lower order priority order, and transfer from lower order priority order to higher order priority order has to be rejected for some reason (e.g., a plan to use for a predetermined period).

Accordingly, with the third embodiment, an example is illustrated where, in the event that a transfer request from lower order priority order to higher order priority order is made, an appeal from the lower order wireless communication device is taken into consideration. Note that the configuration of the communication system according to the third embodiment is generally the same as with the example shown in FIG. 3 and so forth, and accordingly, description will be partially omitted regarding portions which are in common with the first embodiment.

Example of Determination Standards Relating to Transfer of MCIM Usage Rights

FIG. 22 is a diagram illustrating an example of determination standards relating to transfer of the MCIM usage rights between the wireless communication devices according to third second embodiment. Note that the determination standards shown in FIG. 22 are a partial modification of FIG. 17, so portions which are equivalent to those in FIG. 17 are denoted with the same reference numerals, and description thereof will be omitted.

Specifically, with the determination standards shown in FIG. 22, even in a case where the determination standards shown in FIG. 17 yield "permissible", at the time of rejection (appeal) by the lower order wireless communication device, transfer is performed under the condition that authorization is obtained from the higher order wireless communication device. That is to say, even in the event that a MCIM usage rights transfer operation from a lower order wireless communication device to a higher order wireless communication device is performed, a certain level of restriction is provided to the transfer of the MCIM usage rights.

Now, let us assume a case wherein, as shown in FIG. 4, for example, the priority order set to the second wireless communication device 130 is lower than the priority order set to the first wireless communication device 300. For example, we will assume a case that a transfer request for transferring the MCIM usage rights from the first wireless communication device 300 to the second wireless communication device 130 has been accepted from a wireless communication device other than the first wireless communication device 300, for example. In this case, the control unit 210 effects control to transfer the MCIM usage rights from the first wireless communication device 300 to the second wireless communication device 130 only in the event that predetermined conditions are satisfied. For example, the control unit 210 determines that the predetermined conditions have been satisfied in the event that authorization processing of the transfer relating to that transfer request has been performed at the second wireless communication device 130. Alternatively, the control unit 210 determines that the predetermined conditions have been satisfied in the event that authorization processing of the transfer relating to that transfer request has not been performed at the second wireless communication device 130 but authorization processing of the transfer relating to the transfer request has been performed at the first wireless communication device 300.

Figure 23:
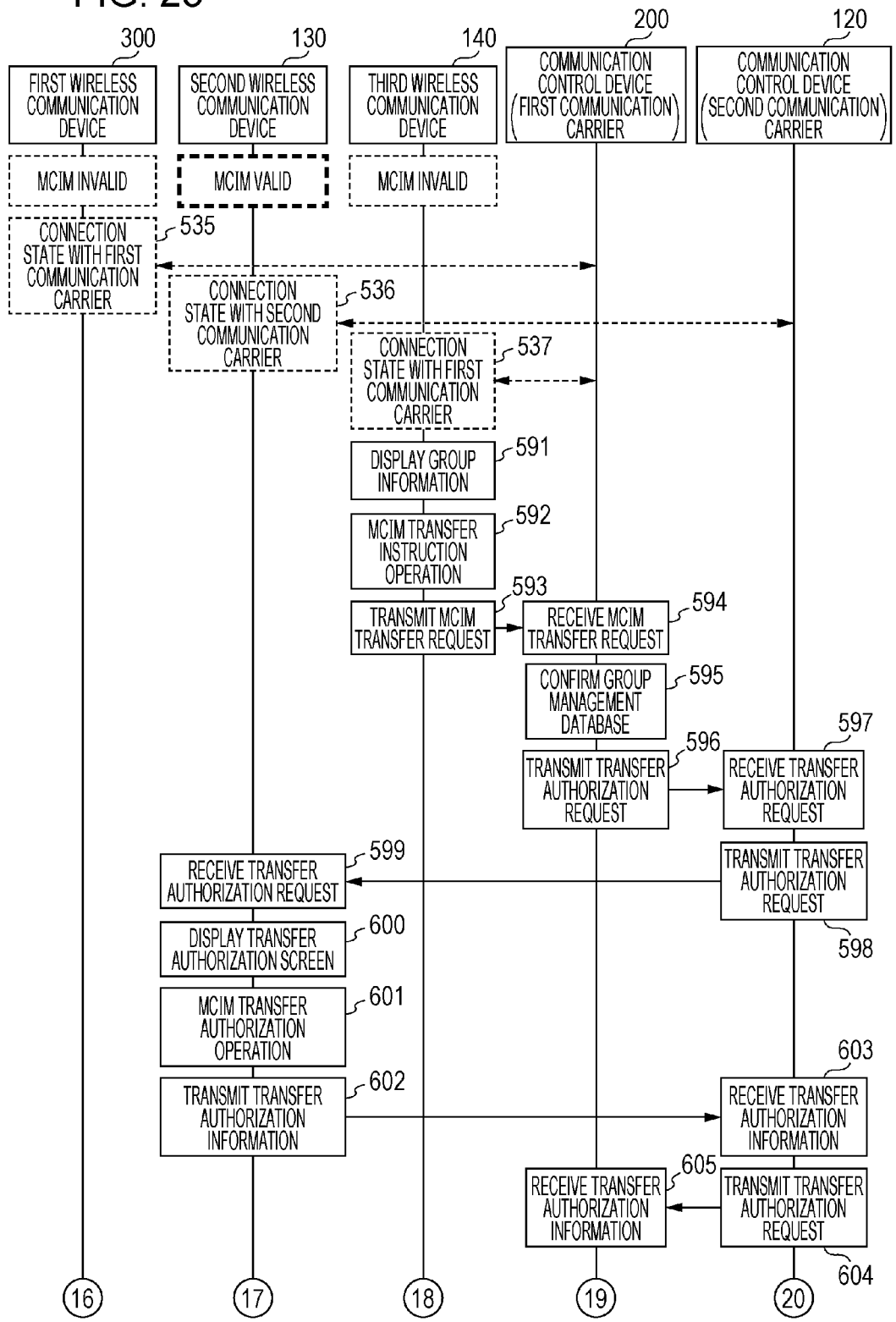
FIG. 23 is a sequence chart illustrating a communication processing example between devices making up the communication system according to the third embodiment.

Communication Example in Case of Performing MCIM Usage Rights Transfer Processing FIGS. 23 and 24 are a sequence chart illustrating a communication processing example between the devices making up the communication system 100 according to the third embodiment. The sequence chart illustrated in FIGS. 23 and 24 is a modification of the arrangement in FIGS. 14 and 15, so part of the description will be omitted regarding portions held in common with FIGS. 14 and 15. Also, description will be made with FIGS. 23 and 24 regarding an example of performing a transfer request using the third wireless communication device 140 which does not have MCIM usage rights and which is not an object of transfer (i.e., neither transfer source nor transfer destination).

The processing shown in FIG. 23 (591 through 594) corresponds to the processing in FIG. 14 (538 through 541). Upon receiving the MCIM transfer request (594), the control unit 210 of the communication control device (first communication carrier) 200 confirms whether or not to perform the transfer processing relating to the received MCIM transfer request using the group management database 220 (595).

Now, in the example illustrated in FIGS. 23 and 24, the priority order of the transfer source is lower order and the priority order of the transfer destination is higher order, and the transfer instruction operation is not an operation made from the transfer source (with lower order priority order). In this case, the determination standards example in FIG. 22 shows this to be "permissible with re-authorization of higher order device only in case of rejection at lower order device". Accordingly, the control unit 210 of the communication control device (first communication carrier) 200 performs transfer authorization at the transfer source wireless communication device (with lower order priority order).

Now, in the event that the transfer authorization has been rejected, the control unit 210 of the communication control device (first communication carrier) 200 determines to perform the transfer processing relating to the received MCIM transfer request under the condition of having received authorization of the transfer destination wireless communication device (with higher order priority order) (595). Also, in the event that the transfer authorization has been authorized by the transfer source wireless communication device (with lower order priority order), the control unit 210 of the communication control device (first communication carrier) 200 determines to perform the transfer processing relating to the received MCIM transfer request without authorization of the transfer destination wireless communication device (with higher order priority order) (595).

Also, the control unit 210 of the communication control device (first communication carrier) 200 obtains the information relating to the transfer source and transfer designation (device name, terminal identification information, etc.) to be transmitted to the transfer source (first wireless communication device 300), from the group management database 220.

Next, the control unit 210 of the communication control device (first communication carrier) 200 transmits a transfer authorization request to the wireless communication device identified by the terminal identification information of the transfer source, included in the received MCIM transfer request (596 through 599). This transfer authorization request includes information relating to the transfer source and transfer destination, included in the received MCIM transfer request.

Also, upon receiving the transfer authorization request (599), the second wireless communication device 130 displays a transfer authorization screen for the user to perform authorization regarding the transfer of the MCIM usage rights, on the display unit 370 of the first wireless communication device 300 (600). For example, the transfer authorization screen 450 shown in FIG. 18 is displayed on the display unit 370. MCIM transfer authorization operations are the same as with the processing in FIG. 19 (571), so detailed description will be omitted here.

In the event that an MCIM usage rights transfer authorization operation (pressing of the OK button 452) has been performed (601), a transfer authorization notification to the effect that transfer of the MCIM usage rights is authorized, is transmitted to the communication control device (first communication carrier) 200 (602 through 605). Now, in the event that transfer authorization information to the effect of authorizing the transfer of the MCIM usage rights is transmitted to the communication control device (first communication carrier) 200 (602 through 605), the processing relating to the transfer authorization request as to the transfer source wireless communication device (606 through 611) is not performed.

Also, in the event that there is no response from the transfer source after a predetermined amount of time elapses, the transfer authorization request can be considered to have been authorized. On the other hand, in the event that the cancel button 453 has been pressed (601), transfer authorization information to the effect that transfer of the MCIM usage rights is not authorized is transmitted from the second wireless communication device 130 (602 through 605).

In the event that transfer authorization information to the effect of not authorizing the transfer of the MCIM usage rights is received (605), the control unit 210 of the communication control device (first communication carrier) 200 transmits a transfer authorization request to the transfer destination wireless communication device (606, 607). Subsequent processing following transmission of this transfer authorization request (606 through 623) is generally the same as with the processing in FIGS. 19 and 20 (568 through 587), so detailed description will be omitted here.

Thus, with the third embodiment, in the event of rejection (appeal) by the lower order wireless communication device, MCIM usage rights transfer processing is performed under the condition of having received authorization by a higher order wireless communication device. That is to say, permission/non-permission to transfer the MCIM usage rights is accepted from the transfer source (lower order), and in the event of having accepted an appeal to the effect of not authorizing the transfer of the MCIM usage rights, the final judgment relating to transfer to the MCIM usage rights is relegated to the transfer destination (higher order).

While FIGS. 23 and 24 illustrate an example of performing MCIM transfer instruction operations using the third wireless communication device 140, the embodiments can be applied to a case of performing MCIM transfer instruction operations using the second wireless communication device 130 or another wireless communication device (including a wireless communication device which does not belong to the group AB).

Note that while an example has been illustrated with the embodiments where each wireless communication device making up a group has a different priority order set thereto, but an arrangement may be made where multiple wireless communication devices are set to the same priority order. Thus, in the event of transferring MCIM usage rights between wireless communication devices set to the same priority order, this can be viewed as being transfer from higher order priority order to lower order priority order. Also, in the event of transferring MCIM usage rights between wireless communication devices set to the same priority order, transfer processing of MCIM usage rights can be performed without determination being made regarding priority order. On the other hand, an arrangement may be made wherein setting the wireless communication devices making up the group to the same priority order is not allowed.

With the embodiments, description has been made regarding an example of information processing devices configured integrally (communication control devices 120, 200, etc.), but the embodiments may be applied to an information processing system where the part of these information processing devices (e.g., control unit 210, group management database 220) are configured of multiple devices. Also, while the embodiments have been described with regard to an example of a group AB configured of four wireless communication devices, the embodiments can be applied to groups configured of two, three, or five or more wireless communication devices.

The embodiments can be applied to mobile wireless communication devices (e.g., dedicated data communication terminal devices), fixed wireless communication devices, and so forth. For example, the embodiments can be applied to wireless communication devices to collect data from vending machines, wireless communication devices installed in elevators, automobiles, electronic equipment (e.g., home appliances, gaming devices, digital photo frames), and so forth.

Also, the embodiments have been described with an example of MCIM usage rights being the network connection rights (connection rights), but the embodiments can be applied to connection rights for connecting to a predetermined network based on other information (e.g., USIM (Universal Subscriber Identity Module)) as well.

Note that the above-described examples are examples of carrying out the present technology, and that there is correspondence between specific elements disclosed in the embodiments and the features according to an embodiment of the disclosure. In the same way, there is correspondence between the features in the claims and specific elements disclosed in the embodiments bearing the same names. Note however, that the present technology is not restricted to the embodiments, and can be carried out by making various modifications to the embodiments without departing from the essence thereof.

Also, the processing procedures described in the above embodiments may also be understood to be a method having these series of procedures, and also may be understood to be a program causing a computer to execute these series of procedures and a recording medium to stored the program. Examples of this recording medium include CD (Compact Disc), MD (MiniDisc), DVD (Digital Versatile Disk), memory card, Blu-ray Disc (registered trademark), and so forth.

Also, the present technology may have the following configurations.

(1) An information processing device, including: a setting unit configured to set, based on user operations or predetermined rules, a priority order regarding multiple wireless communication devices sharing connection rights to connect to a predetermined network using wireless communication; wherein, in the event that transfer of the connection rights is to be performed between the multiple wireless communication devices using wireless communication, the transfer is performed based on the priority order set to the wireless communication devices which are the object of the transfer.

(2) The information processing device according to (1), further including: a control unit configured to control, in the event of accepting a transfer request for transferring the connection rights between the plurality of wireless communication devices, transfer of the connection rights between the wireless communication devices based on the priority order set to the wireless communication devices relating to the transfer request; wherein the information processing device is an information processing device managing the plurality of wireless communication devices as a group.

(3) The information processing device according to (2), wherein, with regard to a first wireless communication device and a second wireless communication device making up the plurality of wireless communication devices, the setting unit sets the second wireless communication device to a priority order lower than a priority order set to the first wireless communication device; and wherein the control unit, in the event of having accepted the transfer request to transfer the connection rights from the first wireless communication device to the second wireless communication device, from a wireless communication device other than the first wireless communication device, effects control to transfer the connection rights from the first wireless communication device to the second wireless communication device only in the event that predetermined conditions are satisfied.

(4) The information processing device according to (3), wherein the control unit determines that the predetermined conditions have been satisfied in the event that transfer authorization processing has been performed at the first wireless communication device, relating to the transfer request to transfer the connection rights from the first wireless communication device to the second wireless communication device.

(5) The information processing device according to any one of (2) through (4), wherein, with regard to a first wireless communication device and a second wireless communication device making up the plurality of wireless communication devices, the setting unit sets the second wireless communication device to a priority order lower than a priority order set to the first wireless communication device; and wherein the control unit, in the event of having accepted the transfer request to transfer the connection rights from the second wireless communication device to the first wireless communication device, effects control to transfer the connection rights from the second wireless communication device to the first wireless communication device.

(6) The information processing device according to (5), wherein the control unit, in the event of having accepted the transfer request to transfer the connection rights from the second wireless communication device to the first wireless communication device, from a wireless communication device other than the second wireless communication device, effects control to transfer the connection rights from the second wireless communication device to the first wireless communication device only in the event that predetermined conditions are satisfied.

(7) The information processing device according to (6), wherein the control unit determines that the predetermined conditions have been satisfied in a case of transfer authorization processing having been performed at the second wireless communication device, relating to the transfer request to transfer the connection rights from the second wireless communication device to the first wireless communication device, or in a case of transfer authorization processing having not been performed at the second wireless communication device relating to the transfer request, and also authorization processing having been performed at the first wireless communication device relating to the transfer request.

(8) The information processing device according to any one of (2) through (7), wherein, with regard to a first wireless communication device and a second wireless communication device making up the plurality of wireless communication devices, the setting unit sets the second wireless communication device to a priority order lower than a priority order set to the first wireless communication device; and wherein the control unit, in the event of having accepted the transfer request from the first wireless communication device to transfer the connection rights from the first wireless communication device to the second wireless communication device, effects control to transfer the connection rights from the first wireless communication device to the second wireless communication device.

(9) The information processing device according to any one of (1) through (8), wherein the setting unit sets priority order for each of the plurality of wireless communication devices as the priority order.

(10) The information processing device according to any one of (1) through (9), further including: a storage unit configured to store the plurality of wireless communication devices and the set priority order, in a correlated manner for each of the wireless communication devices; wherein the information processing device is an information processing device managing the plurality of wireless communication devices as a group, and the storage is performed in increments of the groups.

(11) The information processing device according to any one of (1) through (10), further including a control unit configured to perform the transfer request for transfer of the connection rights between the plurality of wireless communication devices to an RO (Registration Operator); wherein the information processing device is the wireless communication device.

(12) The information processing device according to any one of (1) through (11), wherein the connection rights are rights to connect to a base station operated by a communication carrier, based on subscriber authentication information to connect to the base station.

(13) A communication system, including: an information processing device configured to set, based on user operations or predetermined rules, a priority order regarding multiple wireless communication devices sharing connection rights to connect to a predetermined network using wireless communication; wherein, in the event that transfer of the connection rights is to be performed between the multiple wireless communication devices using wireless communication, the transfer is performed based on the priority order set to the wireless communication devices which are the object of the transfer.

(14) An information processing method, including: accepting of a transfer request for transferring connection rights between a plurality of wireless communication devices sharing connection rights to connect to a predetermined network using wireless communication; and controlling, in the event that the transfer request has been accepted, so as to perform the transfer based on the priority order set to the wireless communication devices which are the object of transfer relating to the transfer request.

The present disclosure contains subject matter related to that disclosed in Japanese Priority Patent Application JP 2011-219703 filed in the Japan Patent Office on Oct. 4, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An information processing device, comprising:
a setting unit configured to set, based on user operations or predetermined rules, a priority order regarding multiple wireless communication devices sharing connection rights to connect to a predetermined network using wireless communication;
wherein, in the event that transfer of said connection rights is to be performed between said multiple wireless communication devices using wireless communication, said transfer is performed based on the priority order set to the wireless communication devices which are the object of said transfer.

2. The information processing device according to claim 1, further comprising a control unit configured to perform a transfer request for transfer of said connection rights between said multiple wireless communication devices to an RO (Registration Operator);
  wherein said information processing device is said wireless communication device.

3. The information processing device according to claim 1, wherein said connection rights are rights to connect to a base station operated by a communication carrier, based on subscriber authentication information to connect to said base station.

4. An information processing device, comprising:
  a setting unit configured to set, based on user operations or predetermined rules, a priority order regarding a plurality of wireless communication devices sharing connection rights to connect to a predetermined network using wireless communication; and
  a control unit configured to control, in the event of accepting a transfer request for transferring said connection rights between said plurality of wireless communication devices using said wireless communication, transfer of said connection rights between said plurality of wireless communication devices based on the priority order set to said plurality of wireless communication devices relating to said transfer request;
  wherein said information processing device is an information processing device managing said plurality of wireless communication devices as a group.

5. The information processing device according to claim 4, wherein, with regard to a first wireless communication device and a second wireless communication device making up said plurality of wireless communication devices, said setting unit sets said second wireless communication device to a priority order lower than a priority order set to said first wireless communication device;
  and wherein said control unit, in the event of having accepted said transfer request to transfer said connection rights from said first wireless communication device to said second wireless communication device, from a wireless communication device other than said first wireless communication device, effects control to transfer said connection rights from said first wireless communication device to said second wireless communication device only in the event that predetermined conditions are satisfied.

6. The information processing device according to claim 5, wherein said control unit determines that said predetermined conditions have been satisfied in the event that transfer authorization processing has been performed at said first wireless communication device, relating to said transfer request to transfer said connection rights from said first wireless communication device to said second wireless communication device.

7. The information processing device according to claim 4, wherein, with regard to a first wireless communication device and a second wireless communication device making up said plurality of wireless communication devices, said setting unit sets said second wireless communication device to a priority order lower than a priority order set to said first wireless communication device;
  and wherein said control unit, in the event of having accepted said transfer request to transfer said connection rights from said second wireless communication device to said first wireless communication device, effects control to transfer said connection rights from said second wireless communication device to said first wireless communication device.

8. The information processing device according to claim 7, wherein said control unit, in the event of having accepted said transfer request to transfer said connection rights from said second wireless communication device to said first wireless communication device, from a wireless communication device other than said second wireless communication device, effects control to transfer said connection rights from said second wireless communication device to said first wireless communication device only in the event that predetermined conditions are satisfied.

9. The information processing device according to claim 8, wherein said control unit determines that said predetermined conditions have been satisfied in a case of transfer authorization processing having been performed at said second wireless communication device, relating to said transfer request to transfer said connection rights from said second wireless communication device to said first wireless communication device, or in a case of transfer authorization processing having not been performed at said second wireless communication device relating to said transfer request, and also authorization processing having been performed at said first wireless communication device relating to said transfer request.

10. The information processing device according to claim 4, wherein, with regard to a first wireless communication device and a second wireless communication device making up said plurality of wireless communication devices, said setting unit sets said second wireless communication device to a priority order lower than a priority order set to said first wireless communication device;
  and wherein said control unit, in the event of having accepted said transfer request from said first wireless communication device to transfer said connection rights from said first wireless communication device to said second wireless communication device, effects control to transfer said connection rights from said first wireless communication device to said second wireless communication device.

11. The information processing device according to claim 4, wherein said setting unit sets priority order for each of said plurality of wireless communication devices as said priority order.

12. The information processing device according to claim 4, further comprising:
  a storage unit configured to store said plurality of wireless communication devices and said set priority order, in a correlated manner for each of said plurality of wireless communication devices;
  wherein said information processing device is an information processing device managing said plurality of wireless communication devices as a group, and said storage is performed in increments of said groups.

13. A communication system, comprising:
  an information processing device configured to set, based on user operations or predetermined rules, a priority order regarding multiple wireless communication devices sharing connection rights to connect to a predetermined network using wireless communication;
  wherein, in the event that transfer of said connection rights is to be performed between said multiple wireless communication devices using wireless communication, said transfer is performed based on the priority order set to the wireless communication devices which are the object of said transfer.

14. An information processing method, comprising:

accepting of a transfer request for transferring connection rights between a plurality of wireless communication devices sharing said connection rights to connect to a predetermined network using wireless communication; and controlling, in the event that said transfer request has been accepted, so as to perform said transfer based on a priority order set to the wireless communication devices which are the object of transfer relating to said transfer request.

* * * * *